United States Patent
Höglund et al.

(10) Patent No.: US 12,143,934 B2
(45) Date of Patent: Nov. 12, 2024

(54) RADIO NETWORK NODE, USER EQUIPMENT (UE) AND METHODS PERFORMED IN A WIRELESS COMMUNICATION NETWORK

(71) Applicant: Telefonaktiebolaget LM Ericsson (publ), Stockholm (SE)

(72) Inventors: Andreas Höglund, Solna (SE); Magnus Åström, Lund (SE); Anders Wallén, Ystad (SE); Yutao Sui, Solna (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 529 days.

(21) Appl. No.: 17/280,263

(22) PCT Filed: Sep. 27, 2019

(86) PCT No.: PCT/SE2019/050936
§ 371 (c)(1),
(2) Date: Mar. 26, 2021

(87) PCT Pub. No.: WO2020/067988
PCT Pub. Date: Apr. 2, 2020

(65) Prior Publication Data
US 2022/0053423 A1    Feb. 17, 2022

Related U.S. Application Data

(60) Provisional application No. 62/737,142, filed on Sep. 27, 2018.

(51) Int. Cl.
*H04W 52/02* (2009.01)
*H04W 4/70* (2018.01)
(Continued)

(52) U.S. Cl.
CPC ..... *H04W 52/0229* (2013.01); *H04W 68/005* (2013.01)

(58) Field of Classification Search
CPC .......... H04W 52/0229; H04W 68/005; H04W 76/40; H04W 52/0216; H04W 4/70; Y02D 30/70
(Continued)

(56) References Cited

U.S. PATENT DOCUMENTS

| 2008/0212506 A1* | 9/2008 | Lee | ......... H04W 72/23 370/310 |
| 2013/0301566 A1* | 11/2013 | Wei | ......... H04W 48/08 370/329 |

(Continued)

FOREIGN PATENT DOCUMENTS

UA    101188 U  *  8/2015  ................ B61P 5/14

OTHER PUBLICATIONS

3GPP TSG RAN WG1 Meeting #91 R1- 1720423 Rano, USA, Nov. 27"~Dec. 1, 2017 Agenda item: 6.2.6.1.1.2 (Year: 2017).*

(Continued)

*Primary Examiner* — Inder P Mehra
(74) *Attorney, Agent, or Firm* — Rothwell, Figg, Ernst & Manbeck, P.C.

(57) ABSTRACT

Embodiments relate to e.g. a method performed by radio network node (12) for paging a UE (10) in a wireless communication network. The UE (10) transmits a paging signal on a carrier to the UE (10), wherein the carrier is associated with a second paging signal for a second type of UEs. A first number of carriers are configured for a first paging signal of a first type of UEs and a second number of carriers are configured for the second paging signal of the second type of UEs, wherein the first paging signal comprises a first wake-up signal, WUS, and wherein the second
(Continued)

paging signal comprises a group wake up signal, WUS, for a group of UEs of the second type of UEs.

19 Claims, 11 Drawing Sheets

(51) Int. Cl.
*H04W 68/00* (2009.01)
*H04W 76/40* (2018.01)

(58) Field of Classification Search
USPC .......................................................... 370/318
See application file for complete search history.

(56) References Cited

U.S. PATENT DOCUMENTS

| | | | | |
|---|---|---|---|---|
| 2015/0280881 A1* | 10/2015 | Gao | ...................... | H04W 48/12 |
| | | | | 370/329 |
| 2019/0021034 A1* | 1/2019 | Kim | ........................ | H04W 8/08 |
| 2019/0090190 A1* | 3/2019 | Liu | ................... | H04W 28/0215 |
| 2020/0053647 A1* | 2/2020 | Chae | ................. | H04W 52/0229 |
| 2020/0229095 A1* | 7/2020 | Shrestha | ................. | H04W 4/70 |
| 2021/0314851 A1* | 10/2021 | Ratasuk | ................ | H04W 48/10 |

OTHER PUBLICATIONS

GPP TSG RAN WG1 Meoting #91 R1-1720423 Rano, USA, Nov. 27"~Dec. 1, 2017 Agenda item: 6.2.6.1.1.2 (Year: 2017).*
International Search Report and Written Opinion issued in International Application No. PCT/SE2019/050936 dated Nov. 20, 2019 (12 pages).
IPRP issued in International Application No. PCT/SE2019/050936 dated Nov. 9, 2020 (11 pages).
Qualcomm Incorporated, "Further discussion on WUS configurations and procedures", vol. RAN WG1, No. Reno, USA; Nov. 27, 2017-Dec. 1, 2017, Nov. 18, 2017 (Nov. 18, 2017), 3GPP Draft; R1-1720423, 3rd Generation Partnership Project (3GPP), Mobile Competence Centre ; 650, Route Des Lucioles ; F-06921 Sophia-Antipolis Cedex; France (8 pages).
Ericsson, "UE-group wake-up signal in NB-IoT", vol. RAN WG1, No. Gothenburg, Sweden; Aug. 20, 2018-Aug. 24, 2018, Aug. 10, 2018 (Aug. 10, 2018), 3GPP Draft; R1-1808043 UE-Group Wake-Up Signal in NB-IoT, 3rd Generation Partnership Project (3GPP), Mobile Competence Centre ; 650, Route Des Lucioles ; F-06921 Sophia-Antipolis Cedex ; France (3 pages).
Huawei et al., "On support for UE-group wake-up signal", vol. RAN WG1, No. Gothenburg, Sweden; Aug. 20, 2018-Aug. 24, 2018, Aug. 11, 2018 (Aug. 11, 2018), 3GPP Draft; R1-1808107, 3rd Generation Partnership Project (3GPP), Mobile Competence Centre ; 650, Route Des Lucioles ; F-06921 Sophia-Antipolis Cedex France (4 pages).
3GPP TS 36.300 V15.2.0 (Jun. 2018), 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 15) Jun. 2018 (357 pages).
3GPP TS 36.304 V15.0.0 (Jun. 2018) 3rd Generation Partnership Project; Technical Specification Group Radio Access Network; Evolved Universal Terrestrial Radio Access (E-UTRA); User Equipment (UE) procedures in idle mode (Release 15) Jun. 2018 (52 pages).
3GPP TS 36.211 V15.2.0 (Jun. 2018), 3rd Generation Partnership Project; Technical Specification Group Radio Access Network; Evolved Universal Terrestrial Radio Access (E-UTRA); Physical channels and modulation (Release 15) Jun. 2018 (8 pages).

* cited by examiner

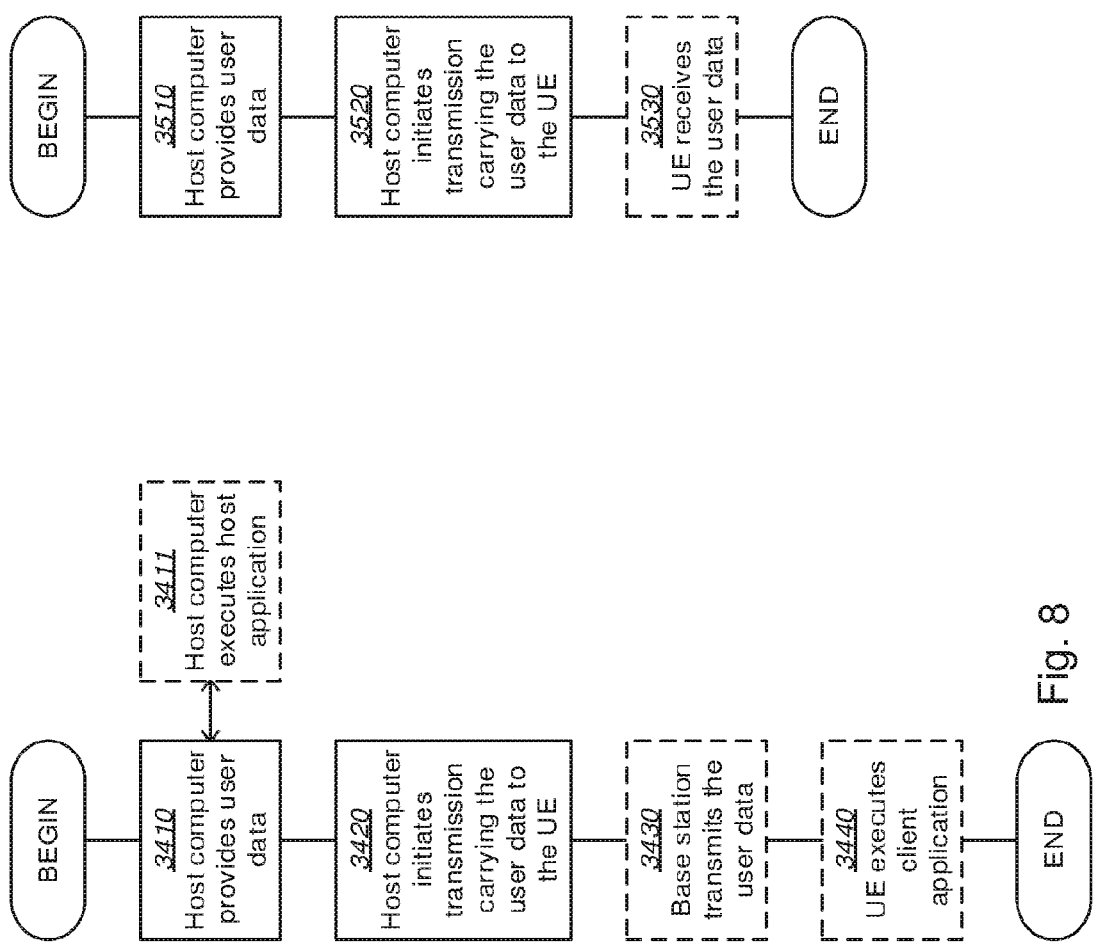

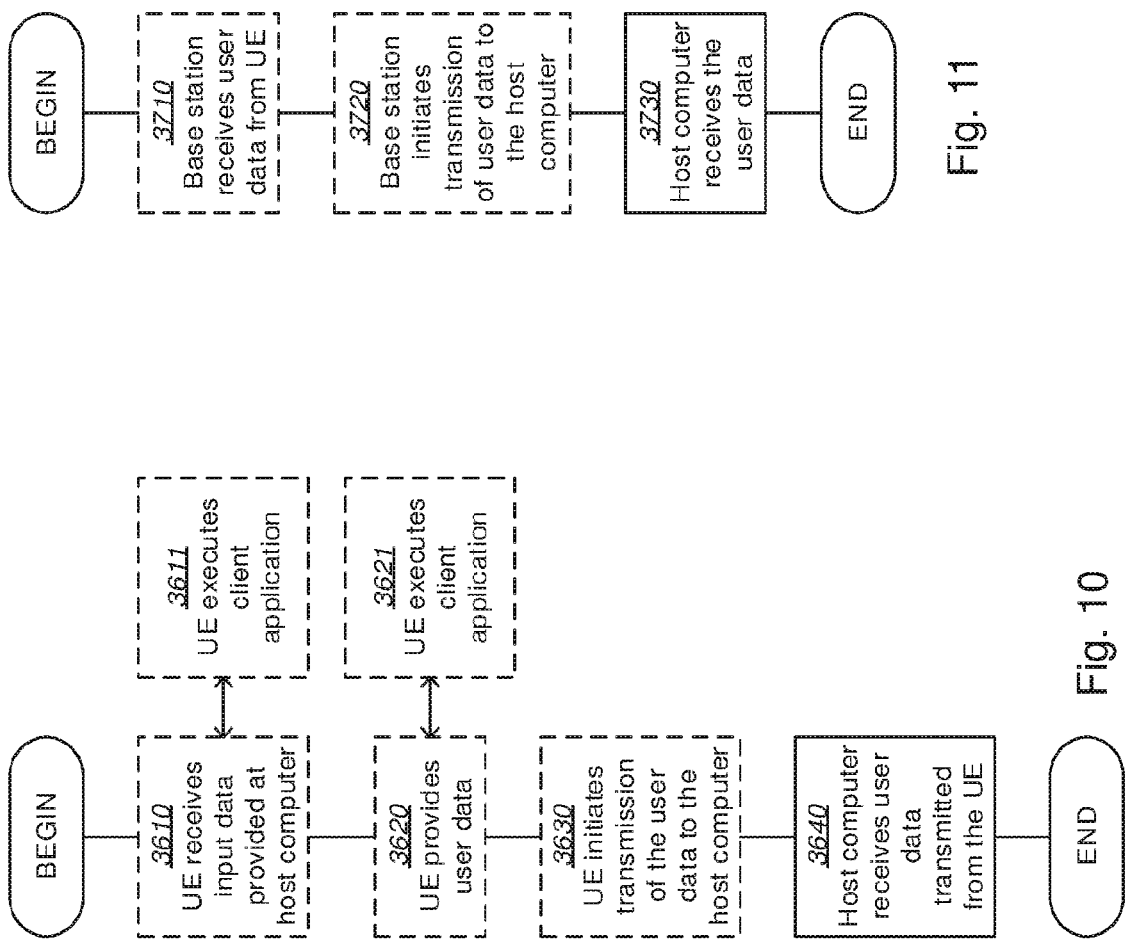

RADIO NETWORK NODE, USER EQUIPMENT (UE) AND METHODS PERFORMED IN A WIRELESS COMMUNICATION NETWORK

CROSS REFERENCE TO RELATED APPLICATION(S)

This application is a 35 U.S.C. § 371 National Stage of International Patent Application No. PCT/SE2019/050936, filed on Sep. 27, 2019, which claims priority to U.S. provisional patent application No. 62/737,142, filed on Sep. 27, 2018. The above identified applications are incorporated by this reference.

TECHNICAL FIELD

Embodiments herein relate to a radio network node, a user equipment (UE) and methods performed therein regarding wireless communication. Furthermore, a computer program product and a computer-readable storage medium are also provided herein. Especially, embodiments herein relate to handling communication, such as paging UEs, in a wireless communication network.

INTRODUCTION

In a typical wireless communication network, UEs, also known as wireless communication devices, mobile stations, stations (STA) and/or wireless devices, communicate via a Radio access Network (RAN) to one or more core networks (CN). The RAN covers a geographical area which is divided into service areas or cell areas, with each service area or cell area being served by network node such as an access node e.g. a Wi-Fi access point or a radio base station (RBS), which in some radio access technologies (RAT) may also be called, for example, a NodeB, an evolved NodeB (eNodeB) and a gNodeB (gNB). The service area or cell area is a geographical area where radio coverage is provided by the radio network node. The radio network node operates on radio frequencies to communicate over an air interface with the wireless devices within range of the access node. The radio network node communicates over a downlink (DL) to the wireless device and the wireless device communicates over an uplink (UL) to the access node.

A Universal Mobile Telecommunications System (UMTS) is a third generation telecommunication network, which evolved from the second generation (2G) Global System for Mobile Communications (GSM). The UMTS terrestrial radio access network (UTRAN) is essentially a RAN using wideband code division multiple access (WCDMA) and/or High-Speed Packet Access (HSPA) for communication with user equipments. In a forum known as the Third Generation Partnership Project (3GPP), telecommunications suppliers propose and agree upon standards for present and future generation networks and UTRAN specifically, and investigate enhanced data rate and radio capacity. In some RANs, e.g. as in UMTS, several radio network nodes may be connected, e.g., by landlines or microwave, to a controller node, such as a radio network controller (RNC) or a base station controller (BSC), which supervises and coordinates various activities of the plural radio network nodes connected thereto. The RNCs are typically connected to one or more core networks.

Specifications for the Evolved Packet System (EPS) have been completed within the 3$^{rd}$ Generation Partnership Project (3GPP) and this work continues in the coming 3GPP releases, such as 4G and 5G networks. The EPS comprises the Evolved Universal Terrestrial Radio Access Network (E-UTRAN), also known as the Long-Term Evolution (LTE) radio access network, and the Evolved Packet Core (EPC), also known as System Architecture Evolution (SAE) core network. E-UTRAN/LTE is a 3GPP radio access technology wherein the radio network nodes are directly connected to the EPC core network. As such, the Radio Access Network (RAN) of an EPS has an essentially "flat" architecture comprising radio network nodes connected directly to one or more core networks.

With the emerging 5G technologies also known as new radio NR, the use of very many transmit- and receive-antenna elements is of great interest as it makes it possible to utilize beamforming, such as transmit-side and receive-side beamforming. Transmit-side beamforming means that the transmitter can amplify the transmitted signals in a selected direction or directions, while suppressing the transmitted signals in other directions. Similarly, on the receive-side, a receiver can amplify signals from a selected direction or directions, while suppressing unwanted signals from other directions.

Beamforming allows the signal to be stronger for an individual connection. On the transmit-side this may be achieved by a concentration of the transmitted power in the desired direction(s), and on the receive-side this may be achieved by an increased receiver sensitivity in the desired direction(s). This beamforming enhances throughput and coverage of the connection. It also allows reducing the interference from unwanted signals, thereby enabling several simultaneous transmissions over multiple individual connections using the same resources in the time-frequency grid, so-called multi-user Multiple Input Multiple Output (MIMO).

There has been a lot of work in 3GPP lately on specifying technologies to cover Machine-to-Machine (M2M) and/or Internet of Things (IoT) related use cases. Most recent work for 3GPP Release 13 and 14 includes enhancements to support Machine-Type Communications (MTC) with new UE categories (Cat-M1, Cat-M2), supporting reduced bandwidth of 6 physical resource blocks (PRBs) (up to 24 PRBs for Cat-M2), and Narrowband IoT (NB-IoT) UEs providing a new radio interface, and e.g. UE categories, Cat-NB1 and Cat-NB2.

LTE enhancements introduced in 3GPP Release 13, 14 and 15 for MTC are also referred to as "eMTC", "feMTC", "efeMTC", "LTE-M" and "LTE-MTC", including (not limiting) support for bandwidth limited UEs, Cat-M1, and support for coverage enhancements. Herein, the term LTE-M will primarily be used. This is to separate discussion from NB-IoT (notation here used for any Release), although the supported features are similar on a general level.

There are multiple differences between "legacy" LTE and the procedures and channels defined for LTE-M and for NB-IoT. Some important differences include a new physical channel, such as the physical downlink control channels, called MPDCCH in LTE-M and NPDCCH in NB-IoT, and a new physical random access channel, NPRACH, for NB-IoT. Another important difference is the coverage level (also known as coverage enhancement level) that these technologies can support. By applying repetitions to the transmitted signals and channels, both LTE-M and NB-IoT allow UE operation down to much lower signal to noise ratio (SNR) level compared to LTE, i.e. Es/Iot≥−15 dB being the lowest operating point for LTE-M and NB-IoT which can be compared to −6 dB Es/IoT for "legacy" LTE.

Power Saving Objective in Rel-15

In Release 15, there is a common work item (WI) objective in the approved work items (WI) for both NB-IoT and Rel-15 enhancements for LTE-M. The description for NB-IoT is as follows:

Work on the following objectives to commence from RAN #75, according to TU allocation per working group, and strive for completion by RAN #78:

Further latency and power consumption reduction

Power consumption reduction for physical channels

Study and, if found beneficial, specify for idle mode paging and/or connected mode discontinuous reception (DRX), physical signal and/or channel that can be efficiently decoded or detected prior to decoding narrowband physical downlink control or shared channel (NPDCCH/NPDSCH).

And with a similar formulation for LTE-M:

Improved Power Consumption:

Power consumption reduction for physical channels

Study and, if found beneficial for idle mode paging and/or connected mode DRX, specify physical signal and/or channel that can be efficiently decoded or detected prior to decoding the physical downlink control and/or data channel.

A 'Wake-up signal' (WUS) is based on the transmission of a short signal that indicates to the UE that it should continue to decode the DL control channel e.g. full NPDCCH for NB-IoT. If such signal is absent (DTX i.e. UE does not detect it) then the UE can go back to sleep without decoding the DL control channel. The decoding time for a WUS is considerably shorter than that of the full NPDCCH since it essentially only needs to contain one bit of information whereas the NPDCCH may contain up to 35 bits of information. This, in turn, reduces UE power consumption and leads to longer UE battery life. The 'Wake-up signal' (WUS) would be transmitted only when there is paging for the UE. But if there is no paging for the UE then the WUS will not be transmitted (i.e., implying a discontinuous transmission, DTX) and the UE would go back to sleep e.g. upon detecting DTX instead of WUS. This is illustrated in FIG. 1, where white blocks indicate possible WUS and PO positions whereas the black boxes indicate actual WUS and PO positions.

FIG. 1 shows location of a WUS and the paging occasion to which it is associated.

The specification of Rel-15 WUS is spread out over several parts of the LTE 36-series standard, e.g., 36.211, 36.213, 36.304 and 36.331. The sequence is e.g., defined in 36.211 as follows:

The NWUS sequence w(m) in subframe $x = 0, 1, \ldots, M-1$ is defined by $$w(m) = \theta_{n_f, n_s}(m') \cdot e^{\frac{j\pi u n(n+1)}{131}}$$

$m = 0, 1, \ldots, 131$ $m' = m + 132x$ $n = m \bmod 132$ $$\theta_{n_f, n_s}(m') = \begin{cases} 1, & \text{if } c_{n_f, n_s}(2m') = 0 \text{ and } c_{n_f, n_s}(2m'+1) = 0 \\ -1, & \text{if } c_{n_f, n_s}(2m') = 0 \text{ and } c_{n_f, n_s}(2m'+1) = 1 \\ j, & \text{if } c_{n_f, n_s}(2m') = 1 \text{ and } c_{n_f, n_s}(2m'+1) = 0 \\ -j, & \text{if } c_{n_f, n_s}(2m') = 1 \text{ and } c_{n_f, n_s}(2m'+1) = 1 \end{cases}$$

$u = (N_{ID}^{Ncell} \bmod 126) + 3$ where M is the actual duration of NWUS as defined in 3GPP TS 36.213.
The scrambling sequence $c_{n_f, n_s}(i)$, $i = 0, 1, \ldots, 2 \cdot 132M - 1$ is given by clause 7.2, and shall be initialized at the start of the NWUS with $$c_{init\_WUS} = (N_{ID}^{Ncell} + 1)\left(\left(10 n_{f\_start\_PO} + \left\lfloor \frac{n_{s\_start\_PO}}{2} \right\rfloor\right) \bmod 2048 + 1\right) 2^9 + N_{ID}^{Ncell}$$

where $n_{f\_start\_PO}$ is the first frame of the first PO to which the NWUS is associated, and $n_{s\_start\_PO}$ is the first slot of the first PO to which the NWUS is associated.

And further:

... the NWUS sequence w(m) shall be mapped to resource elements (k,l) in sequence, starting with w(0) in increasing order of first the index $k = 0, 1, \ldots, N_{sc}^{RB} - 1$, over the 12 assigned subcarriers and then the index $l = 3, 4, \ldots, 2N_{symb}^{DL} - 1$ in each subframe in which NWUS is transmitted.

As is evident from the equations above, the WUS sequence is only dependent on the time instant of the PO to which it is associated and the eNB cell id. That implies that it is not possible to further distinguish which UE(s) that is paged among the UEs belonging to the same PO. In most cases only a single UE is paged at a time, in which case the remaining UEs will unnecessarily monitor the subsequent NPDCCH.

WUS UE Grouping Objective in Rel-16

In the Rel-16 WID, it was agreed that WUS should be further developed to also include UE grouping, such that the number of UEs that are sensitive to the WUS is further narrowed down to a smaller subset of the UEs that are associated with a specific paging occasion (PO):

The objective is to specify the following set of improvements for machine-type communications for BL/CE UEs.

Improved DL Transmission Efficiency and/or UE Power Consumption:

. . .

Specify support for UE-group wake-up signal (WUS)

SUMMARY

Requirements on UE-Grouping

The Rel-15 WUS was designed such that all UEs belongs to the same group. That is, a transmitted WUS associated to a specific paging occasion (PO) may wake-up all UEs that are configured to detect paging at that PO. Hence, all UEs which are not targeted by the page, will wake up unnecessarily.

Both LTE-M and NB-IoT have been developed with varying applications in mind. Contrary to the mobile broadband (MBB) use case, the IoT realm have widely different use cases in terms of e.g., paging rates, latency, baseband processing power etc. In one network, a power switch for street lights effectively being paged once daily, with resulting extremely low paging rates may be deployed, whereas in another network, a machine controlling device may be paged on a second basis. For these two networks, it is apparent that paging will differ substantially, and, consequently, that the same UE-grouping configuration may be ill suited.

The problem with adopting the Rel-16 WUS UE-grouping is that paging using Rel-15 WUS and Rel-16 UE-group WUS should coexist. The added benefit of Rel-16 UE-group WUS comes from reduced false paging, that is, a UE would more rarely be woken up to monitor paging when other UEs are being paged but not itself. Because of this Rel-16 UE-group WUS enabled UEs should not be required to also monitor and potentially be woken up by Rel-15 WUS, false paging would then be equally bad or worse than Rel-15. Rel-15 WUS and Rel-16 WUS must therefore be able to coexist, both for paging multiplexing of Rel-15 WUS enabled UEs and Rel-16 WUS enabled UEs, and for common paging such as system information change notification where all UEs can be reached within a broadcast control channel (BCCH) modification period.

An object of embodiments herein is to provide a mechanism that improves the handling of communications in the wireless communication network.

According to an aspect the object is achieved by providing a method performed by radio network node for paging a UE in a wireless communication network. The radio network node transmits a second paging signal on a carrier to the UE, wherein the carrier is associated with the second paging signal for a second type of UEs, and wherein a first number of carriers are configured for a first paging signal for a first type of UEs and a second number of carriers are configured for the second paging signal for the second type of UEs. The first paging signal comprises a first wake-up signal (WUS) and the second paging signal comprises a group WUS for a group of UEs of the second type of UEs. E.g. the radio network node transmits a paging signal such as a wake up signal (WUS) on a carrier, wherein the carrier is associated with a release or type of the UE. A first number of carriers may be configured for a first type or release of UEs and a second number of carriers may be configured for a second type or release of UEs. The carrier may be associated with the release or type of the UE by being configured for the release or type of the UE or by carrying the indication, e.g. information element, over the carrier indicating that the carrier is for the type or release of the UE.

According to another aspect the object is achieved by providing a method performed by a UE for monitoring a paging channel in a wireless communication network, wherein the UE is of a second type of UEs out of a first and second types of UEs. The UE monitors for a second paging signal on a carrier, wherein the carrier is associated with the second paging signal for the second type of UEs, wherein a first number of carriers are configured for a first paging signal for the first type of UEs and a second number of carriers are configured for the second paging signal for the second type of UEs. The first paging signal comprises a first WUS and wherein the second paging signal comprises a group WUS for a group of UEs of the second type of UEs. E.g. the UE monitors for a paging signal such as a wake up signal (WUS) on a carrier, wherein the carrier is associated with a release or type of the UE. The UE may detect an indication, e.g. information element, over the carrier indicating that the carrier is for the type or release of the UE.

According to still another aspect the object is achieved by providing a radio network node for paging a UE in a wireless communication network. The radio network node is configured to transmit a second paging signal on a carrier to the UE, wherein the carrier is associated with the second paging signal for a second type of UEs, wherein a first number of carriers are configured for a first paging signal for a first type of UEs and a second number of carriers are configured for the second paging signal for the second type of UEs. The first paging signal comprises a first WUS, and the second paging signal comprises a group WUS for a group of UEs of the second type of UEs.

According to still another aspect the object is achieved by providing a UE for monitoring a paging channel in a wireless communication network, wherein the UE is of a second type of UEs out of a first and second types of UEs. The UE is configured to monitor for a second paging signal on a carrier, wherein the carrier is associated with the second paging signal for the second type of UEs, wherein a first number of carriers are configured for a first paging signal for the first type of UEs and a second number of carriers are configured for the second paging signal for the second type of UEs. The first paging signal comprises a first WUS and wherein the second paging signal comprises a group WUS for a group of UEs of the second type of UEs.

It is furthermore provided herein a computer program product comprising instructions, which, when executed on at least one processor, cause the at least one processor to carry out any of the methods above, as performed by the radio network node, or the UE. It is additionally provided herein a computer-readable storage medium, having stored thereon a computer program product comprising instructions which, when executed on at least one processor, cause the at least one processor to carry out the method according to any of the methods above, as performed by the radio network node, or the UE.

Embodiments herein enable a solution where paging using Rel-15 WUS and paging using Rel-16 UE-group WUS may be configured separately. That is, it can e.g. be supported to completely separate the paging to page UEs enabled with Rel-15 WUS on certain NB-IoT carriers and UEs enabled with Rel-16 UE-group WUS on other carriers. Thereby, the network has the possibility of "frequency multiplexing" to page Rel-15 WUS UEs and Rel-16 UE-group WUS UEs simultaneously.

Since the carriers are associated with a paging signal of a type or release of the UE, embodiments herein solve the coexistence of different types of UEs such as UEs supporting Rel-15 WUS and UEs supporting Rel-16 UE-group WUS.

BRIEF DESCRIPTION OF THE DRAWINGS

Embodiments will now be described in more detail in relation to the enclosed drawings, in which:

FIGS. 8-11 are flowcharts illustrating methods implemented in a communication system including a host computer, a base station and a user equipment.

DETAILED DESCRIPTION

Embodiments herein are described within the context of 3GPP LTE radio technology (3GPP TS 36.300 V15.2.0 (June 2018)). It is understood, that the problems and solutions described herein are equally applicable to wireless access networks and user-equipments (UEs) implementing other access technologies and standards. LTE is used as an example technology where embodiments are suitable, and using LTE in the description therefore is particularly useful for understanding the problem and solutions solving the problem. In particular, embodiments are applicable also to other radio access technologies, such as 3GPP NR, or 3GPP LTE and NR integration, also denoted as non-standalone NR.

Figure 1:
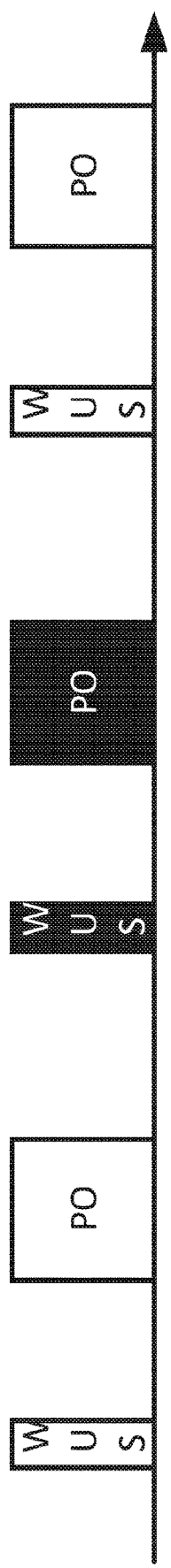
FIG. 1 shows location of WUSs and paging occasions.
Figure 2:
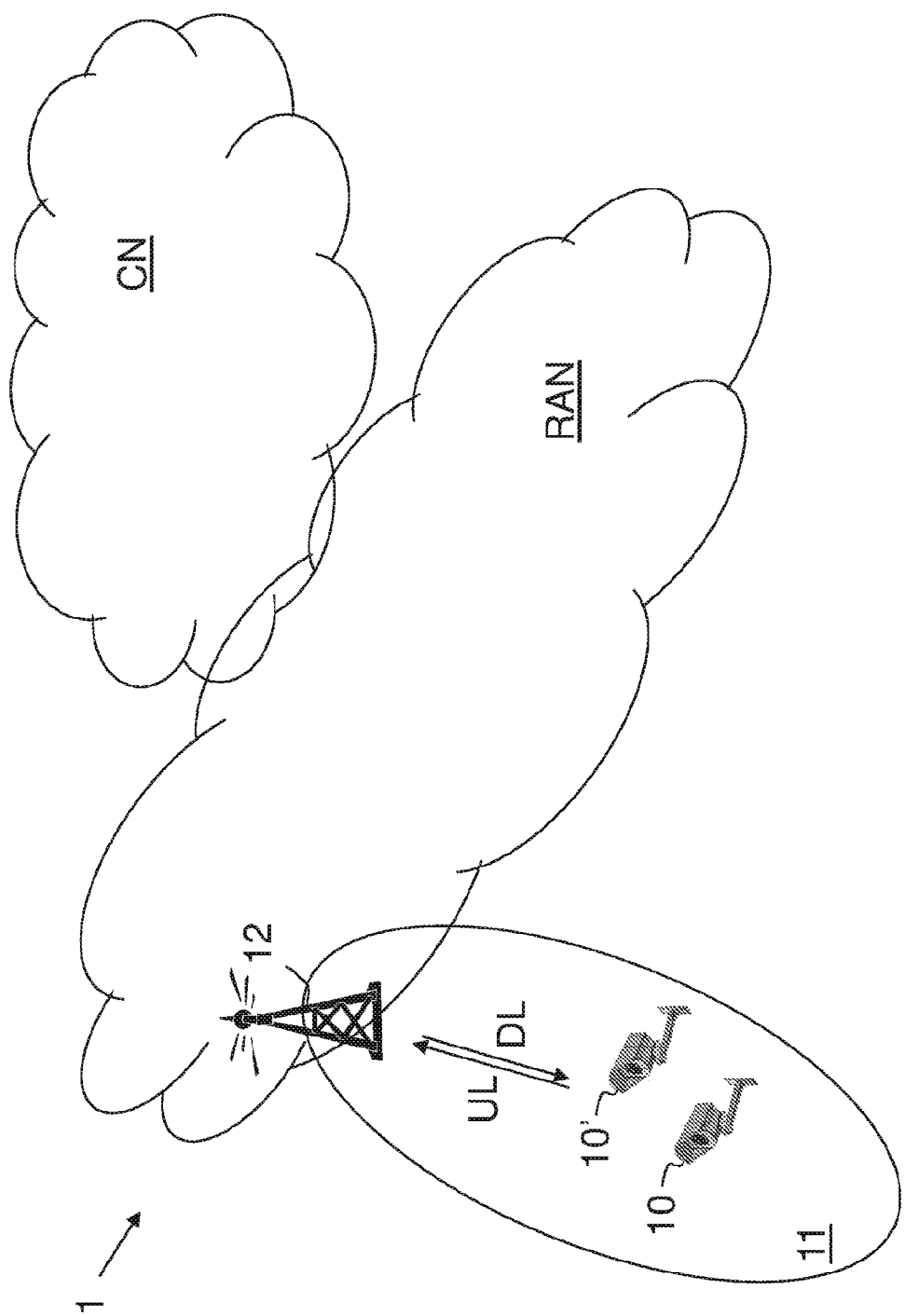
FIG. 2 is a schematic overview depicting a wireless communication network according to embodiments herein.

Embodiments herein relate to wireless communication networks in general. FIG. 2 is a schematic overview depicting a wireless communication network 1. The wireless communication network 1 comprises one or more RANs and one or more CNs. The wireless communication network 1 may use one or a number of different technologies, such as NR, Wi-Fi, Long Term Evolution (LTE), LTE-Advanced, Fifth Generation (5G), Wideband Code Division Multiple Access (WCDMA), Global System for Mobile communications/enhanced Data rate for GSM Evolution (GSM/EDGE), Worldwide Interoperability for Microwave Access (WiMax), or Ultra Mobile Broadband (UMB), just to mention a few possible implementations. Embodiments herein relate to recent technology trends that are of particular interest in a context of NB-IoT and LTE-M, however, embodiments are also applicable to 5G and in further development of the existing wireless communication systems such as e.g. WCDMA and LTE.

In the wireless communication network 1, wireless devices also known as UEs e.g. a first UE 10 and a second UE 10' such as a mobile station, a non-access point (non-AP) STA, a STA, a user equipment and/or a wireless terminal, communicate via one or more Access Networks (AN), e.g. RAN, to one or more core networks (CN). It should be understood by the skilled in the art that "UE" is a non-limiting term which means any terminal, wireless communication terminal, user equipment, Machine Type Communication (MTC) device, Device to Device (D2D) terminal, or node e.g. smart phone, laptop, mobile phone, sensor, relay, mobile tablets or even a small base station capable of communicating using radio communication with a network node within an area served by the network node. The first UE 10 may be a legacy UE being of a release before release 16 and the second UE 10' may be a non-legacy UE i.e. release 16 or later.

The wireless communication network 1 comprises a first radio network node 12 providing radio coverage over a geographical area, a first service area 11, of a first radio access technology (RAT), such as LTE, WiMAX or similar. The first radio network node 12 may be a transmission and reception point e.g. a radio network node such as a Wireless Local Area Network (WLAN) access point or an Access Point Station (AP STA), an access node, an access controller, a base station, e.g. a radio base station such as a NodeB, an evolved Node B (eNB, eNode B), a gNodeB (gNB), a base transceiver station, a radio remote unit, an Access Point Base Station, a base station router, a transmission arrangement of a radio base station, a stand-alone access point or any other network unit or node capable of communicating with a UE within the area served by the first network node 12 depending e.g. on the first radio access technology and terminology used. The first radio network node 12 may alternatively or additionally be a controller node or a packet processing node such as a radio controller node or similar. The first network node may be referred to as a serving network node wherein the first cell may be referred to as a serving cell, and the serving network node communicates with the UE 10 in form of DL transmissions to the UE 10 and UL transmissions from the UE 10.

It should be noted that a service area may be denoted as cell, beam, beam group or similar to define an area of radio coverage.

The radio network node may transmit reference signals (RS), such as cell specific-reference signals (CRS), over respective service area. Hence, the radio network node 12 may transmit reference signals for mobility purposes of UEs, such as CRS or beam reference signals (BRS), repeatedly, in time, in a large number of different directions using as many Tx-beams as deemed necessary to cover an operational area of the respective radio network node. Hence the radio network node 12 provides radio coverage over the first service area using a first reference signal, e.g. first CRS, for identifying the first service area 11 in the wireless communication network.

When developing embodiments herein a problem has first been identified in e.g. NB-IoT.

In Rel-13 NB-IoT paging of UEs is performed on a downlink anchor carrier. One carrier is 1 physical resource block (PRB), i.e. 180 KHz. Rel-13 supports multi-PRB operation, where other carriers are configured, but UEs can only be assigned to those during a connected session, i.e. while in RRC_CONNECTED state. That is, all RRC_IDLE mode operations are performed on the downlink and uplink anchor carriers respectively, only frequency division duplex (FDD) is supported in Rel-13.

In Rel-14, support paging and random access is introduced on non-anchor carriers to be able to distribute the paging and random access load over all used carriers. This means that narrowband physical random access channel (NPRACH) and physical control channel (PCCH) can configured also for non-anchor carriers, which are then used by UEs and radio network node for random access and paging accordingly.

In Rel-15 the wake-up signal (WUS) was introduced in order to reduce UE power consumption. The WUS monitoring is shorter, and hence less energy consuming for the UE, than to monitor the (M/N) physical downlink control channel (PDCCH) for paging. The WUS is only transmitted if the UE, or any other UE sharing a same paging occasion (PO), is being paged. If WUS is detected the UE will continue to monitor (M/N)PDCCH for paging and read the downlink control information (DCI) containing the downlink assignment to the (N)PDSCH transmission carrying the paging message. It is specified that the WUS is transmitted in the carrier (or narrowband for LTE-M) where the UE is being paged.

In Rel-16, more information is added to the WUS to indicate that only part of the UEs sharing a PO are being paged. That is, the false paging probability is reduced as described in the problem description above. The problem is that Rel-16 UEs should not be woken up by the Rel-15 WUS signal, and the Rel-15 WUS signal should not be altered in order to be backwards compatible. In the following paragraphs we use WUS both as a general denotation of a wake-up signal, and specifically for referring to the Rel-15 WUS, whereas GWUS (stands for group WUS) is used for referring specifically to the Rel-16 WUS. Notice there can be Rel-16 UEs that do not support WUS or GWUS, or Rel-16 UEs that support the Rel-15 WUS, but not the GWUS, as the support of WUS or GWUS can be an optional UE capability. When UEs belonging to different releases, or types, are discussed herein, this refers specifically to whether the UE has the capability to support the GWUS such as Rel-16 GWUS or not.

The idea of embodiments herein is to in the configuration such as PCCH configuration separate Rel-15 WUS paging and Rel-16 GWUS paging. That is, a UE enabled with Rel-15 WUS paging would consider a certain set of carriers for paging, and a UE enabled with Rel-16 GWUS paging would consider another set of carriers for paging. Possibly, and most efficient for Rel-15 and Rel-16 coexistence, the sets may be separate, i.e. non-overlapping with no common carriers or with at least one or more non-overlapping carriers.

In one embodiment separation of Rel-16 and Rel-15 UEs on different carriers is achieved by a new information element (IE) added to the PCCH configuration (called ueGroup-Wus-r16 in the ASN.1 syntax example below). UEs (Rel-15 or earlier) that do not support GWUS would not be able to interpret this new IE and would ignore it. Rel-16 UEs supporting GWUS with this parameter set to value true would consider this as a paging carrier if they are enabled with Rel-16 GWUS, if not enabled they would ignore it to ensure the same paging behavior as Rel-15 or earlier. That is, in this embodiment the carrier is either used a Rel-15 WUS paging carrier or as both a Rel-15 and Rel-16 GWUS paging carrier.

In another embodiment, there is a new Rel-16 PCCH configuration, only understood by Rel-16 UEs and accordingly only UEs enabled with Rel-16 GWUS would consider these carriers as paging carriers, and not the carriers with the legacy (pre Rel-16) PCCH configuration. Legacy UEs (Rel-15 and earlier) and Rel-16 UEs without enabled Rel-16 GWUS would ignore the new Rel-16 configuration and consider only the carriers with legacy (pre Rel-16) PCCH configuration for paging. The Rel-16 PCCH configuration would typically be exclusive to ensure that either the legacy PCCH or the new Rel-16 PCCH is configured, creating distinct sets of paging carriers for Rel-15 WUS (and legacy) paging and for Rel-16 GWUS paging. (This could e.g. be achieved by a CHOICE condition but is not included in the ASN.1 example below). A generic example, in which it is possible to configure either Rel-15 WUS (and legacy) paging or Rel-16 GWUS paging, or both simultaneously, for a carrier is given in the ASN.1 example below, in which a new information element PCCH-Config-NB-r16 has been added to the system information.

In one embodiment, both the embodiments above are used at the same time.

In one embodiment, if the Rel-16 GWUS is configured, the paging carrier used for transmitting the WUS intended for the applicable Rel-16 UEs is also used for monitoring the NPDCCH in the associated PO. In another embodiment, the UE may instead monitor NPDCCH on the legacy paging carrier associated with the Rel-15 UE. The UE can be informed whether to monitor NPDCCH on the Rel-16 GWUS carrier or the Rel-15 paging carrier in different ways. In one embodiment it is signaled to the UE via the Rel-16 PCCH configuration in an additional information element (not shown in the ASN.1 example below). In another embodiment it is dynamically selected by having the options being represented as two different UE groups, or by varying some other physical layer characteristics associated with the WUS signal itself, such as, e.g., sequence index or scrambling code.

Depending on the paging load or DL capacity, it is also possible to configure a common set of carriers that can be shared among UEs supporting Rel-16 GWUS and the Rel-15 WUS. The network can indicate this in the configuration either explicitly or the UE can derive this information from the configurations. This enables the UE to have different detection algorithms to ensure a good detection of the GWUS in the presence of WUS.

SystemInformationBlockType22-NB Information Element

```
-- ASN1START
SystemInformationBlockType22-NB-r14 ::=     SEQUENCE {
    dl-ConfigList-r14               DL-ConfigCommonList-NB-r14          OPTIONAL,       -- Need OR
    ul-ConfigList-r14               UL-ConfigCommonList-NB-r14          OPTIONAL,       -- Need OR
    pagingWeightAnchor-r14          PagingWeight-NB-r14                 OPTIONAL,       -- Cond
pcch-config
    nprach-ProbabilityAnchorList-r14    NPRACH-ProbabilityAnchorList-NB-r14     OPTIONAL,       --
Cond nprach-config
    lateNonCriticalExtension            OCTET STRING                        OPTIONAL,
    ...,
    [[ mixedOperationModeConfig-r15     SEQUENCE {
        dl-ConfigListMixed-r15          DL-ConfigCommonList-NE-r14          OPTIONAL,       -- Need
OR
        ul-ConfigListMixed-r15          UL-ConfigCommonList-NB-r14          OPTIONAL,       -- Need
OR
        pagingDistribution-r15          ENUMERATED {true}                   OPTIONAL,       -- Need
OR
        nprach-Distribution-r15         ENUMERATED {true}                   OPTIONAL        -- Need
OR
```

```
                                                                            OPTIONAL,       -- Need
OR
    ul-ConfigList-r15              UL-ConfigCommonListTDD-NB-r15   OPTIONAL          -- Cond
TDD
    ]],
    [[ pcch-Config-NB-r16          PCCH-Config-NB-r16              OPTIONAL          -- Need OR
    ]]
}
DL-ConfigCommonList-NB-r14 ::=     SEQUENCE (SIZE (1.. maxNonAnchorCarriers-NB-r14)) OF
                                       DL-ConfigCommon-NB-r14
UL-ConfigCommonList-NB-r14 ::=     SEQUENCE (SIZE (1.. maxNonAnchorCarriers-NB-r14)) OF
                                       UL-ConfigCommon-NB-r14
UL-ContigCommonListTDD-NB-r15 ::=  SEQUENCE (SIZE (1.. maxNonAnchorCarriers-NB-r14)) OF
                                       UL-ConfigCommonTDD-NB-r15
DL-ConfigCommon-NB-r14 ::=         SEQUENCE {
    dl-CarrierConfig-r14               DL-CarrierConfigCommon-NB-r14,
    pcch-Config-r14                    PCCH-Config-NB-r14              OPTIONAL,     -- Need OR
    ...,
    [[ wus-Config-r15                  WUS-ConfigPerCarrier-NB-r15     OPTIONAL      -- Cond
WUS
    ]]
}
PCCH-Config-NB-r14 ::=             SEQUENCE {
    npdcch-NumRepetitionPaging-r14     ENUMERATED {
                                           r1, r2, r4, r8, r16, r32, r64, r128,
                                           r256, r512, r1024, r2048,
                                           spare4, spare3, spare2, spare1}   OPTIONAL, --
Need OP
    pagingWeight-r14                   PagingWeight-NB-r14 DEFAULT w1,
    ...,
    [[ ueGroup-Wus-r16                 ENUMERATED {true}               OPTIONAL      -- NEED
OR
    ]]
}
PagingWeight-NB-r14 ::=            ENUMERATED {w1, w2, w3, w4, w5, w6, w7, w8,
                                       w9, w10, w11, w12, w13, w14, w15, w16}
PCCH-Config-NB-r16 ::=             SEQUENCE {
    npdcch-NumRepetitionPaging-r16     ENUMERATED {
                                           r1, r2, r4, r8, r16, r32, r64, r128,
                                           r256, r512, r1024, r2048,
                                           spare4, spare3, spare2, spare1}   OPTIONAL, --
Need OP
    pagingWeight-r16                   PagingWeight-NB-r14 DEFAULT w1,
    ...
}
UL-ConfigCommon-NB-r14 ::=         SEQUENCE {
    ul-CarrierFreg-r14                 CarrierFreq-NB-r13,
    nprach-ParametersList-r14          NPRACH-ParametersList-NB-r14    OPTIONAL, -- Need
OR
    ...,
    [[ nprach-ParametersListEDT-r15    NPRACH-ParametersList-NB-r14    OPTIONAL -- Cond
EDT
    ]]
}
UL-ConfigCommonTDD-NB-r15 ::=      SEQUENCE {
    tdd-UL-DL-AlignmentOffset-r15      TDD-UL-DL-AlignmentOffset-NB-r15,
    nprach-ParametersListTDD-r15       NPRACH-ParametersListTDD-NB-r15 OPTIONAL, -- Need
OR
    ...
}
NPRACH-ParametersList-NE-r14 ::=   SEQUENCE (SIZE (1..maxNPRACH-Resources-NB-r13)) OF
                                       NPRACH-Parameters-NB-r14
NPRACH-Parameters-NB-r14 ::=       SEQUENCE {
    nprach-Parameters-r14              SEQUENCE {
        nprach-Periodicity-r14             ENUMERATED {ms40, ms80, ms160, ms240,
                                               ms320, ms640, ms1280, ms2560}
                                               OPTIONAL, -- NEED OP
        nprach-StartTime-r14               ENUMERATED {ms8, ms16, ms32, ms64,
                                               ms128, ms256, ms512, ms1024}
                                               OPTIONAL, -- NEED OP
        nprach-SubcarrierOffset-r14        ENUMERATED {n0, n12, n24, n36, n2, n18,
n34, spare1}
                                               OPTIONAL, -- NEED OP
        nprach-NumSubcarriers-r14          ENUMERATED {n12, n24, n36, n48}
                                               OPTIONAL, -- NEED OP
        nprach-SubcarrierMSG3-RangeStart-r14   ENUMERATED {zero, oneThird, twoThird, one}
                                               OPTIONAL, -- NEED OP
        npdcch-NumRepetitions-RA-r14       ENUMERATED {r1, r2, r4, r8, r16, r32, r64,
r128,
```

```
        npdcch-StartSF-CSS-RA-r14                   r256, r512, r1024, r2048,
                                                      spare4, spare3, spare2, spare1}
                                                    OPTIONAL, -- NEED OP
                                                    ENUMERATED {v1dot5, v2, v4, v8, v16, v32,
            v48, v64}
                                                    OPTIONAL, -- NEED OP
        npdcch-OffSet-RA-r14                        ENUMERATED {zero, OneEighth, oneFourth,
threeEighth}
                                                    OPTIONAL, -- NEED OP
        nprach-NumCBRA-StartSubcarriers-r14         ENUMERATED {n8, n10, n11, n12, n20, n22,
n23, n24,
                                                      n32, n34, n35, n36, n40, n44,
n46, n48}
                                                    OPTIONAL, -- NEED OP
        npdcch-CarrierIndex-r14                     INTEGER (1..maxNonAnchorCarriers-NB-r14)
                                                    OPTIONAL, -- Need OP
        ...
    } OPTIONAL -- Need OR
}
NPRACH-ProbabilityAnchorList-NB-r14 ::=             SEQUENCE (SIZE (1..maxNPRACH-Resources-NB-r13)) OF
                                                      NPRACH-ProbabilityAnchor-NB-r14
NPRACH-ProbabilityAnchor-NB-r14 ::=                 SEQUENCE {
    nprach-ProbabilityAnchor-r14                      ENUMERATED {
                                                        zero, oneSixteenth, oneFifteenth,
oneFourteenth,
                                                        oneThirteenth, oneTwelfth, oneEleventh,
oneTenth,
                                                        oneNinth, oneEighth, oneSeventh, oneSixth,
                                                        oneFifth, oneFourth, oneThird, oneHalf}
                                                    OPTIONAL                  -- Need OP
}
-- ASN1STOP
```

In another embodiment, the legacy PCCH configuration may always be omitted (PCCH-Config-NB-r14) and a new IE (e.g. ueGroup-Wus-r16) is included in the new PCCH configuration (PCCH-Config-NB-r16) to indicate whether is configured for Rel-15 WUS (and legacy) paging, or both Rel-15 WUS and Rel-16 GWUS paging.

In the above embodiments, a Rel-16 GWUS enabled UE would consider a different set of carriers for paging than a legacy UE, but among those chose its paging carrier based e.g., UE_ID or the network can explicitly assign a paging carrier to a group of UEs that have similar traffic patterns. LTE-M The above description is for NB-IoT and for LTE-M the paging works differently. In LTE-M several 'narrowbands' may be defined, where each narrowband is corresponding to 6 PRBs (non-overlapping). A UE will only monitor MPDCCH in one narrowband at a time, but frequency hopping is applied according to a specified pattern. The start position, i.e. starting narrowband for paging, is however defined based on UE_ID and allows for better frequency multiplexing of the UEs and the paging load.

As for NB-IoT, embodiments herein introduce the possibility of configuring different narrowbands for monitoring paging with Rel-15 WUS (or legacy paging monitoring) and for Rel-16 GWUS. Thus, whenever the term "carrier" is used herein for denoting the frequency resource used for monitoring a paging signal, such as a wake up signal and/or a control channel transmission, it may be understood as a narrowband, i.e. 6 PRBs, when applied to LTE-M.

In one embodiment, a separate number of paging narrowbands is defined for Rel-16 GWUS as in the ASN.1 example below.

RadioResourceConfigCommon Information Element

```
-- ASN1START
RadioResourceConfigCommonSIB ::=            SEQUENCE {
    rach-ConfigCommon                           RACH-ConfigCommon,
    bcch-Config                                 BCCH-Config,
    pcch-Config                                 PCCH-Config,
    prach-Config                                PRACH-ConfigSIB,
    pdsch-ConfigCommon                          PDSCH-ConfigCommon,
    pusch-ConfigCommon                          PUSCH-ConfigCommon,
    pucch-ConfigCommon                          PUCCH-ConfigCommon,
    soundingRS-UL-ConfigCommon                  SoundingRS-UL-ConfigCommon,
    uplinkPowerControlCommon                    UplinkPowerControlCommon,
    ul-CyclicPrefixLength                       UL-CyclicPrefixLength,
    ...,
    [[ uplinkPowerControlCommon-v1020           UplinkPowerControlCommon-v1020  OPTIONAL  -- Need OR
    ]],
    [[ tech-ConfigCommon-v1250                     RACH-ConfigCommon-v1250               OPTIONAL -- Need
OR
    ]],
    [[ pusch-ConfigCommon-v1270                 PUSCH-ConfigCommon-v1270        OPTIONAL  -- Need OR
    ]],
```

-continued

```
[[  bcch-Config-v1310              BCCH-Config-v1310           OPTIONAL,  -- Need OR
    pcch-Config-v1310              PCCH-Config-v1310           OPTIONAL,  -- Need OR
    freqHoppingParameters-r13      FreqHoppingParameters-r13   OPTIONAL,  -- Need OR
    pdsch-ConfigCommon-v1310       PDSCH-ConfigCommon-v1310    OPTIONAL,  -- Need OR
    pusch-ConfigCommon-v1310       PUSCH-ConfigCommon-v1310    OPTIONAL,  -- Need OR
    prach-ConfigCommon-v1310       PRACH-ConfigSIB-v1310       OPTIONAL,  -- Need OR
    pucch-ConfigCommon-v1310       PUCCH-ConfigCommon-v1310    OPTIONAL   -- Need OR
]],
[[  highSpeedConfig-r14            HighSpeedConfig-r14                    OPTIONAL, -- Need
OR
    prach-Config-v1430             PRACH-Config-v1430          OPTIONAL,  -- Need OR
    pucch-ConfigCommon-v1430       PUCCH-ConfigCommon-v1430    OPTIONAL   -- Need OR
]],
[[  prach-Config-v1530             PRACH-ConfigSIB-v1530       OPTIONAL,  -- Cond EDT
    ce-RSS-Config-r15              RSS-Config-r15              OPTIONAL,  -- Need OR
    wus-Config-r15                 WUS-Config-r15                         OPTIONAL, -- Need
OR
    highSpeedConfig-v1530          HighSpeedConfig-v1530       OPTIONAL   -- Need OR
]],
[[  pcch-Config-v16xy              PCCH-Config-v16xy           OPTIONAL   -- Need OR
    ]]
}
<omitted text>
PCCH-Config ::=                    SEQUENCE {
    defaultPagingCycle                 ENUMERATED {
                                           rf32, rf64, rf128, rf256},
    nB                                 ENUMERATED {
                                           fourT, twoT, oneT, halfT, quarterT, oneEigthT,
                                           oneSixteenthT, oneThirtySecondT}
}
PCCH-Config-v1310 ::=              SEQUENCE {
    paging-narrowBands-r16             INTEGER (1..maxAvailNarrowBands-r13},
    mpdcch-NumRepetition-Paging-r13    ENUMERATED {r1, r2, r4, r8, r16, r32, r64, r12B, r256},
    nB-v1310                           ENUMERATED {one64thT, one128thT, one256thT}
                                                                           OPTIONAL -- Need
OR
}
PCCH-Config-v16xy ::=              SEQUENCE {
    paging-narrowBands-WUS-r16         INTEGER (1..maxAvailNarrowBands-r13),
    mpdcch-NumRepetition-Paging-r13    ENUMERATED {r1, r2, r4, r8, r16, r32, r64, r128, r256},
    nB-v1310                           ENUMERATED {one64thT, one128thT, one256thT}
                                                                           OPTIONAL -- Need
OR
}
UL-CyclicPrefixLength ::=          ENUMERATED {len1, len2}
HighSpeedConfig-r14 ::=            SEQUENCE {
    highSpeedEnhancedMeasFlag-r14          ENUMERATED {true}   OPTIONAL, -- Need OR
    highSpeedEnhancedDemodulationFlag-r14  ENUMERATED {true}   OPTIONAL  -- Need OR
HighSpeedConfig-v1530 ::=       SEQUENCE {
    highSpeedMeasGapCE-ModeA-r15       ENUMERATED {true}
}
HighSpeedConfigSCell-r14 ::=       SEQUENCE {
    highSpeedEnhancedDemodulationFlag-r14  ENUMERATED {true}   OPTIONAL -- Need OR
}
-- ASN1STOP
```

Where paging-narrowBands is the number of narrowbands used for legacy paging, and paging-narrowBands-WUS is the number of narrowbands used for paging with Rel-16 GWUS. According to TS 36.304 the UE is assigned a paging narrowband (PNB) by the following equation (Nn=paging-narrowBands):

$$PNB = \text{floor}(UE\_ID/(N*Ns)) \bmod Nn$$

Further, the number of narrowbands that can be supported by a certain system bandwidth is given be the table below:

| System BW (MHz) | | Fixed # narrowbands |
|---|---|---|
| 1.4 | 6 | 1 |
| 3 | 15 | 2 |
| 5 | 25 | 4 |
| 10 | 50 | 8 |
| 15 | 75 | 12 |
| 20 | 100 | 16 |

If therefore fewer narrowbands are configured for legacy paging and using Rel-15 WUS, e.g. 6 for a system bandwidth of 10 MHz, 2 narrowbands can be configured separately for paging with Rel-16 GWUS. The PNBs for legacy paging would be determined by the equation above, and in this case the set of possible paging narrowbands would have indexes {0, 1, 2, 3, 4, 5}. That means that the following equation (or a similar expression) could be used to determine the Rel-16 GWUS paging narrowbands:

$$PNB\_groupWus = \text{floor}(UE\_ID/(N*Ns)) \bmod Nwus + Nn$$

That is, the paging narrowband is determined in the same way but with the new number of Rel-16 GWUS paging narrowbands, Nwus, and adding the number of legacy paging narrowbands to obtain the narrowband indexes for the Rel-16 GWUS paging narrowband. I.e. in the above example adding 6 to the set {0, 1} and hence the Rel-16 GWUS paging narrowbands will be {6, 7}. Or the radio network node can explicitly assign a paging carrier to a group of UEs that have similar traffic patterns.

Similar as for NB-IoT, the paging narrowband used for the MPDCCH may be the same as the Rel-16 GWUS paging narrowband, or the same as the legacy Rel-15 paging narrowband. The carrier according to embodiments herein may thus be a paging carrier or a paging narrowband.

Note that in a general scenario the term "radio network node" can be substituted with "transmission point". Distinction between the transmission points (TPs) may typically be based on CRSs or different synchronization signals transmitted. Several TPs may be logically connected to the same radio network node but if they are geographically separated, or are pointing in different propagation directions, the TPs may be subject to the same mobility issues as different radio network nodes. In subsequent sections, the terms "radio network node" and "TP" can be thought of as interchangeable.

Figure 3A:
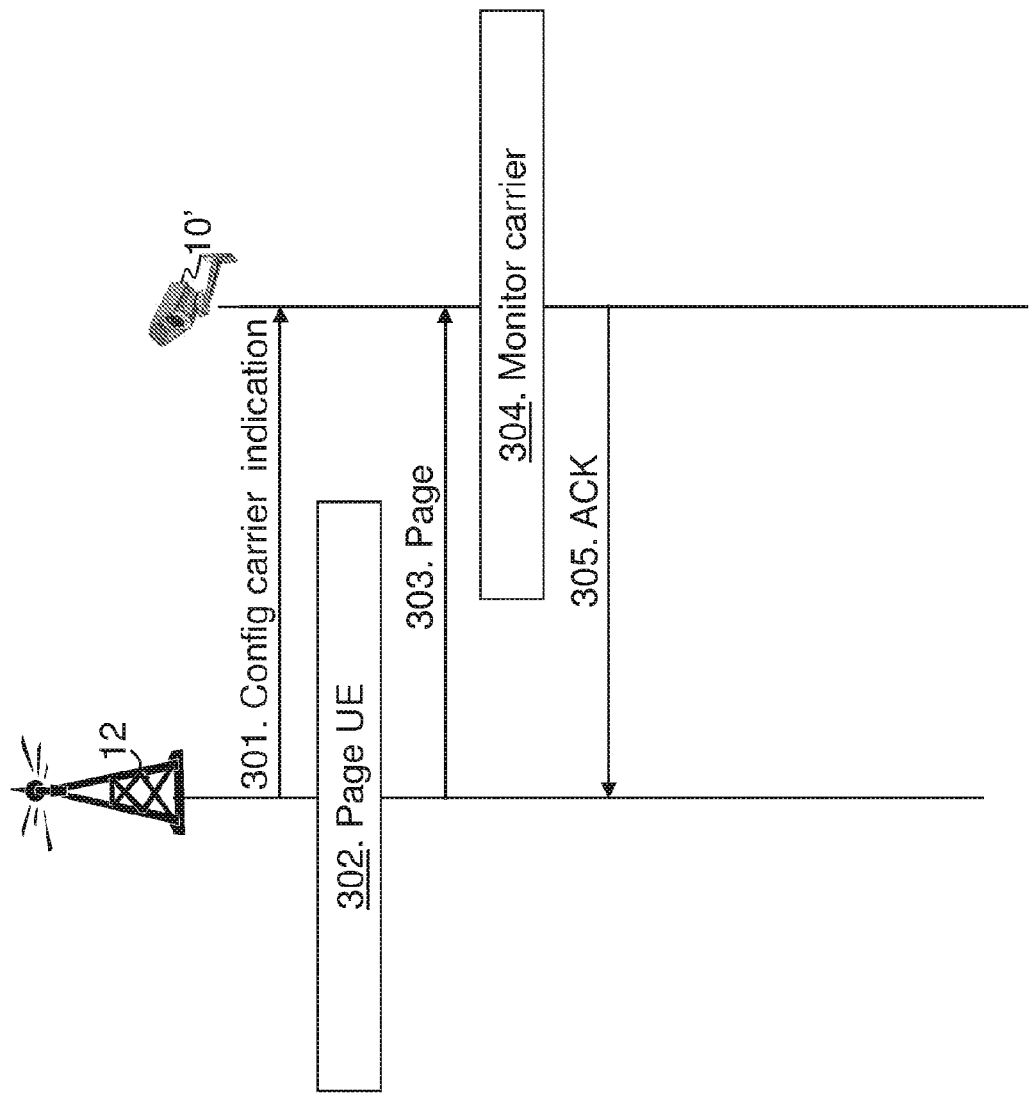
FIG. 3a is a combined signalling scheme and flowchart according to embodiments herein.

FIG. 3a is a combined flowchart and signalling scheme according to embodiments herein. The actions may be performed in any suitable order.

Action 301. The radio network node 12 may configure the UEs e.g. the second UE 10', for informing configuration of separating carriers for different types or releases of UEs. The configuration may be conveyed as part of the system information.

Action 302. The radio network node 12 may determine to page the second UE 10', e.g. receive trigger from another network node, scheduling request from the second UE 10' or having data intended for the second UE 10'.

Action 303. The radio network node 12 pages the second UE 10' over a carrier which carrier is associated with type or release of the second UE 10'. The page may carry indication that the carrier is for certain type or release of UEs.

Action 304. The second UE 10' monitors the carrier being associated with the type of the second UE 10' e.g. detecting the indication that the carrier is for the type of the second UE 10'.

Action 305. The second UE 10' may then decode the paging and acknowledge reception.

Embodiments herein disclose a method to configure separate paging carriers for Rel-15 Wake-up signal and for Rel-16 UE-group Wake-up signal. This solves the coexistence problem and allows for frequency multiplexing of the two paging mechanisms.

Figure 3B:
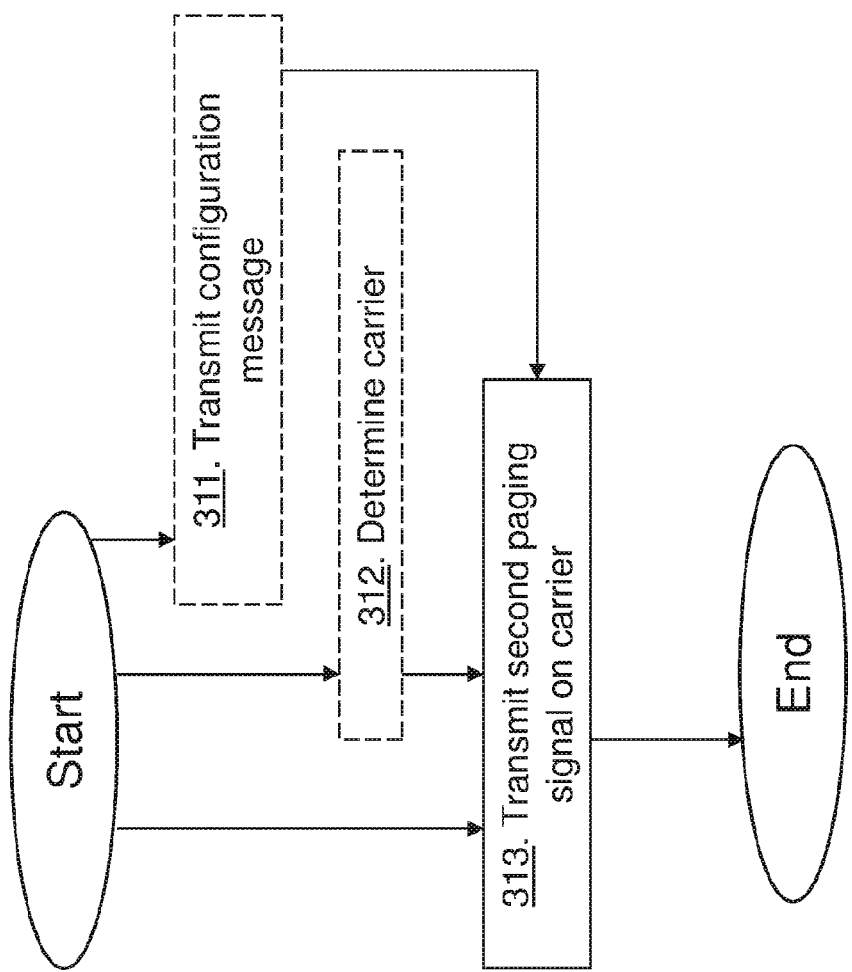
FIG. 3b is a flowchart depicting a method performed by a radio network node according to embodiments herein.

The method actions performed by the radio network node for paging the UE 10 in the wireless communication network according to embodiments will now be described with reference to a flowchart depicted in FIG. 3b. The actions do not have to be taken in the order stated below, but may be taken in any suitable order. Actions performed in some embodiments are marked with dashed boxes.

Action 311. The radio network node 12 may transmit a configuration message carrying information from which the UE determines that the carrier is associated with the second paging signal.

Action 312. The radio network node 12 may determine the carrier used for the second type of UEs for group wake up signal, WUS, based on identity of the UE 10.

Action 313. The radio network node transmits the second paging signal on the carrier to the UE 10, wherein the carrier is associated with the second paging signal for the second type of UEs. The first number of carriers are configured for the first paging signal of the first type of UEs and the second number of carriers are configured for the second paging signal of the second type of UEs. The first paging signal comprises the first WUS and the second paging signal comprises the group WUS for the group of UEs of the second type of UEs. The carrier may be associated with the second paging signal of the second type of UEs by being configured for the second paging signal of the second type of UEs and/or by carrying an indication over the carrier indicating that the carrier is for the second paging signal of the second type of UEs. The second type of UEs may support a WUS according to a release-16 standard, and the first type of UEs do not support the WUS according to the release-16 standard.

Figure 3C:
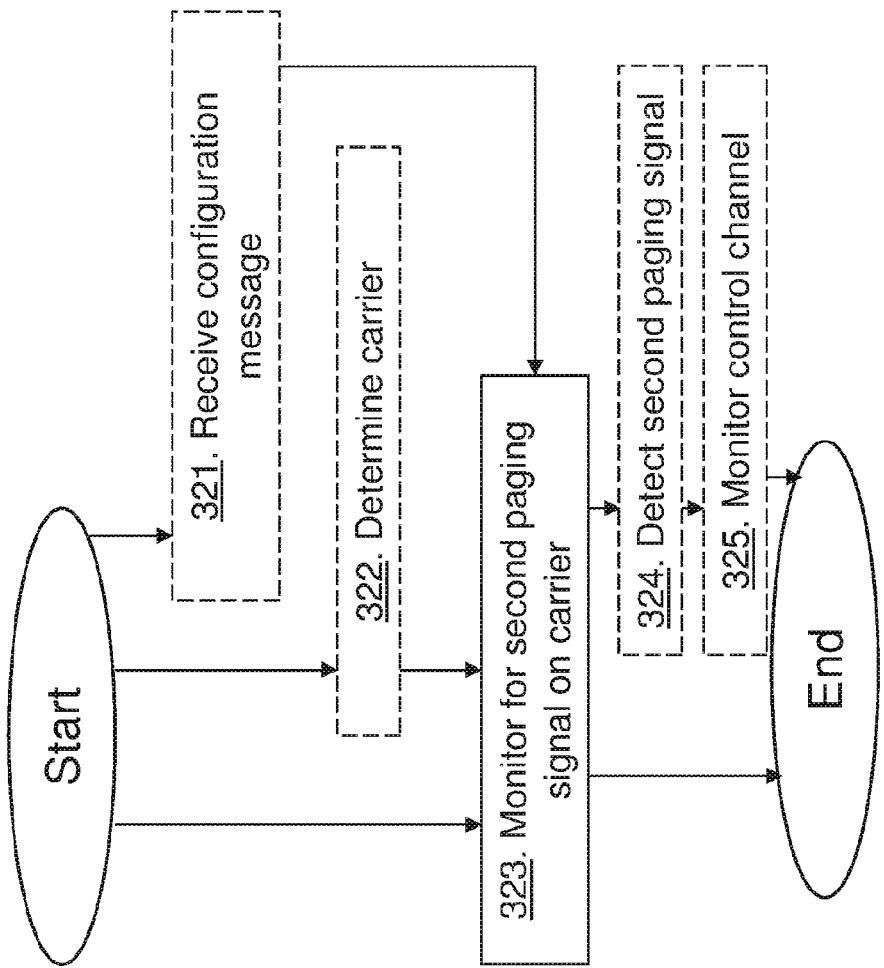
FIG. 3c is a flowchart depicting a method performed by a UE according to embodiments herein.

The method actions performed by the UE 10 for monitoring a paging channel in the wireless communication network according to embodiments will now be described with reference to a flowchart depicted in FIG. 3c. The actions do not have to be taken in the order stated below, but may be taken in any suitable order. Actions performed in some embodiments are marked with dashed boxes. The UE 10 is of a second type of UEs out of a first and second types of UEs Action 321. The UE 10 may receive the configuration message carrying information from which the UE determines the carrier to monitor for the second paging signal. The UE 10 may detect an indication over the carrier, indicating that the carrier is for the second paging signal of the second type of UEs.

Action 322. The UE 10 may determine the carrier used for the second type of UEs for group WUS based on the identity of the UE Action 323. The UE 10 monitors for the second paging signal on the carrier, wherein the carrier is associated with the second paging signal of the second type of UEs, wherein a first number of carriers are configured for the first paging signal of the first type of UEs and the second number of carriers are configured for the second paging signal of the second type of UEs. The first paging signal comprises the first WUS and the second paging signal comprises the GWUS for the group of UEs of the second type of UEs. The carrier may be associated with the second paging signal of the second type of UEs by being configured for the second paging signal of the second type of UEs. The UE may also monitor for the first paging signal on a first carrier, wherein the first carrier is associated with the first paging signal of the first type of UEs. The second type of UEs may support a WUS according to a release-16 standard, and the first type of UEs may not support the WUS according to the release-16 standard.

Action 324. The UE 10 may detect the second paging signal on the carrier.

Action 325. The UE 10 may upon detection of the second paging signal, monitor a control channel on a different carrier. E.g. may detect GWUS on a first carrier and monitor control channel on a second carrier.

Figure 4:
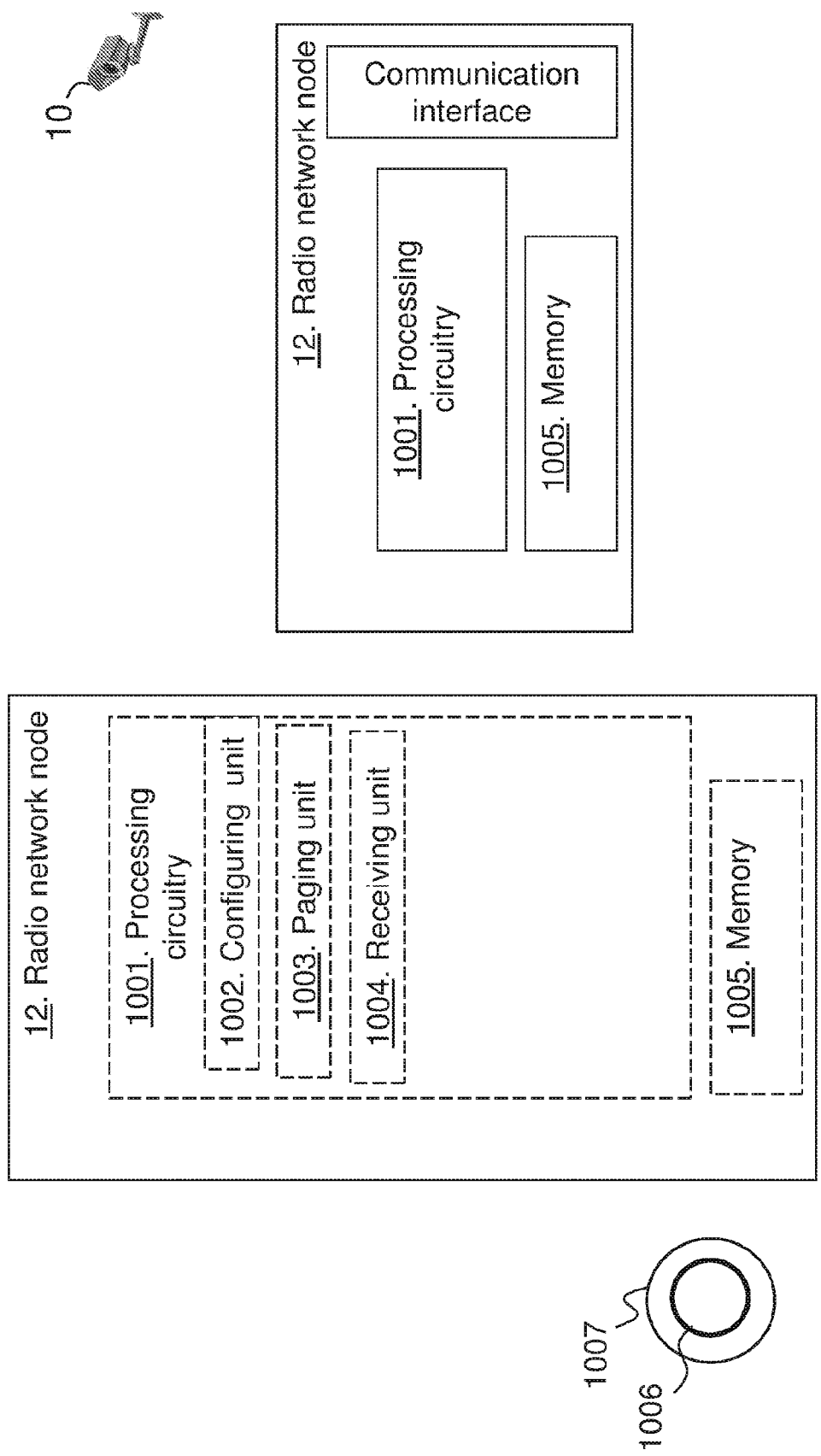
FIG. 4 is a block diagram depicting a radio network node according to embodiments herein.

FIG. 4 is a block diagram depicting the radio network node 12 for paging UEs in the wireless communication network 1 according to embodiments herein.

The radio network node 12 may comprise processing circuitry 1001, e.g. one or more processors, configured to perform the methods herein.

The radio network node 12 may comprise a configuring unit 1002. The radio network node 12, the processing circuitry 1001 and/or the configuring unit 1002 may be configured to configure the UE 10 or the second UE 10' to monitor a carrier associated to type or version of release of UE. The radio network node 12, the processing circuitry 1001 and/or the configuring unit 1002 may be configured to transmit the configuration message carrying information from which the UE determines that the carrier is associated with the second paging signal.

The radio network node 12 may comprise a paging unit 1003. The radio network node 12, the processing circuitry 1001 and/or the paging unit 1003 is configured to transmit the second paging signal such as a wake up signal (WUS) on the carrier, wherein the carrier is associated with the release or type of the UE. The first number of carriers are configured for the first paging signal for a first type of UEs and a second number of carriers are configured for the second paging signal for the second type of UEs, wherein the first paging signal comprises the first WUS, and wherein the second paging signal comprises a group WUS for a group of UEs of the second type of UEs. E.g. the first number of carriers may be configured for the first type or release of UEs, previous Rel 16, and the second number of carriers may be configured for the second type or release of UEs, Rel-16 and later. The carrier may be associated with the second paging signal for the second type of UEs by being configured for the second paging signal for the second type of UEs. The radio network node 12, the processing circuitry 1001 and/or the paging unit 1003 may be configured determine the carrier used for the second type of UEs for group wake up signal, WUS, based on identity of the UE. The second type of UEs may support a WUS according to a release-16 standard, and the first type of UEs may not support the WUS according to the release-16 standard. The radio network node 12, the processing circuitry 1001 and/or the paging unit 1003 may further be configured to transmit an indication, e.g. information element, over the carrier indicating that the carrier is for the type or release of the UE.

The radio network node 12 may comprise a receiving unit 1004, e.g. a receiver or transceiver. The first radio network node 12, the processing circuitry 1001 and/or the receiving module 1004 may configured to receive a confirmation from the UE 10 on a radio resource.

The first radio network node 12 further comprises a memory 1005. The memory comprises one or more units to be used to store data on, such as strengths or qualities, paging message, carriers, mapping of carriers to type/version of UEs, applications to perform the methods disclosed herein when being executed, and similar. The radio network node 12 comprises a communication interface comprising transmitter, receiver, transceiver and/or one or more antennas.

The methods according to the embodiments described herein for radio network node 12 are respectively implemented by means of e.g. a computer program product 1006 or a computer program product, comprising instructions, i.e., software code portions, which, when executed on at least one processor, cause the at least one processor to carry out the actions described herein, as performed by the radio network node 12. The computer program product 1006 may be stored on a computer-readable storage medium 1007, e.g. a universal serial bus (USB) stick, a disc or similar. The computer-readable storage medium 1007, having stored thereon the computer program product, may comprise the instructions which, when executed on at least one processor, cause the at least one processor to carry out the actions described herein, as performed by the radio network node 12. In some embodiments, the computer-readable storage medium may be a non-transitory or transitory computer-readable storage medium.

In some embodiments a more general term "radio network node" is used and it can correspond to any type of radio network node or any network node, which communicates with a wireless device and/or with another network node. Examples of network nodes are NodeB, Master eNB, Secondary eNB, a network node belonging to Master cell group (MCG) or Secondary Cell Group (SCG), base station (BS), multi-standard radio (MSR) radio node such as MSR BS, eNodeB, network controller, radio network controller (RNC), base station controller (BSC), relay, donor node controlling relay, base transceiver station (BTS), access point (AP), transmission points, transmission nodes, Remote Radio Unit (RRU), Remote Radio Head (RRH), nodes in distributed antenna system (DAS), core network node e.g. Mobility Switching Centre (MSC), Mobile Management Entity (MME) etc., Operation and Maintenance (O&M), Operation Support System (OSS), Self-Organizing Network (SON), positioning node e.g. Evolved Serving Mobile Location Centre (E-SMLC), Minimizing Drive Test (MDT) node etc.

Figure 5:
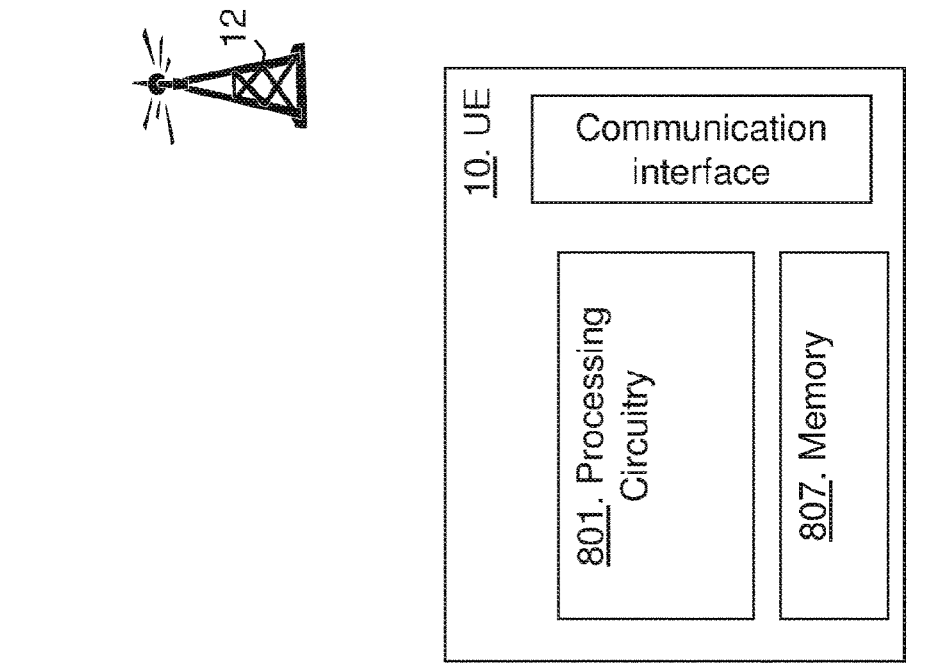
FIG. 5 is a block diagram depicting a UE according to embodiments herein.
Figure 5:
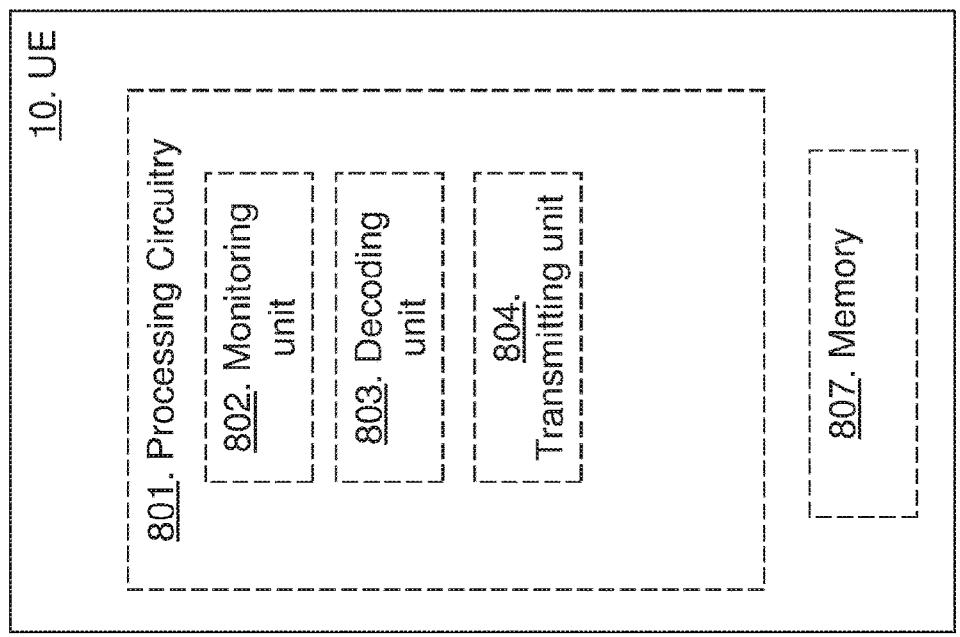
Figure 5:
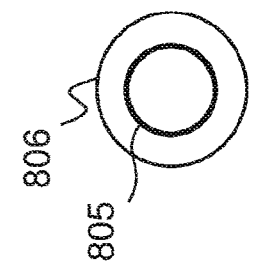

FIG. 5 is a block diagram depicting the UE 10 for handling communication such as monitoring a paging channel in the wireless communication network, wherein the UE is of a second type of UEs out of a first and second types of UEs, e.g. paging channels, or handling paging, in the wireless communication network 1 according to embodiments herein.

The UE 10 may comprise processing circuitry 801, e.g. one or more processors, configured to perform the methods herein.

The UE 10 may comprise a monitoring unit 802, e.g. a receiver or a transceiver. The UE 10, the processing circuitry 801, and/or the monitoring unit 802 is configured to monitor for the second paging signal on the carrier, wherein the carrier is associated with the second paging signal for the second type of UEs, wherein the first number of carriers are configured for the first paging signal for the first type of UEs and the second number of carriers are configured for the second paging signal for the second type of UEs. The first paging signal comprises a first WUS, and the second paging signal comprises a group WUS for a group of UEs of the second type of UEs. The UE 10, the processing circuitry 801, and/or the monitoring unit 802 may be configured to receive configuration data from the first radio network node 12. The configuration data may define how to determine carrier to monitor or similar. The UE 10, the processing circuitry 801, and/or the monitoring unit 802 is further configured to monitor the paging channel in the wireless communication network. The UE monitors for the paging signal such as a wake up signal (WUS) on the carrier, wherein the carrier is associated with the release or type of the UE. The carrier may be associated with the release or type of the UE by being configured for the release or type of the UE or by carrying the indication, e.g. information element, over the carrier indicating that the carrier is for the type or release of the UE. The UE 10, the processing circuitry 801, and/or the monitoring unit 802 may be configured to receive the configuration message carrying information from which the UE determines the carrier to monitor for the second paging signal. The carrier may be associated with the second paging signal for the second type of UEs by being configured for the second paging signal for the second type of UEs. The UE 10, the processing circuitry 801, and/or the monitoring unit 802 may be configured to monitor for a first paging signal on a first carrier, wherein the first carrier is associated with the first paging signal of the first type of UEs. The UE 10, the processing circuitry 801, and/or the monitoring unit 802 may be configured to determine the carrier used for the second type of UEs for group WUS based on an identity of the UE. The second type of UEs may support a WUS according to a release-16 standard, and the first type of UEs may not support the WUS according to the release-16 standard.

The radio network node 12 may comprise an decoding unit 803. The radio network node 12, the processing circuitry 801, and/or the decoding unit 803 may be configured to decode the paging signal when detecting that paging is intended for the type of UE that corresponds to the type of the UE 10. The radio network node 12, the processing circuitry 801, and/or the decoding unit 803 may be configured to detect the second paging signal on the carrier; and upon detection of the second paging signal, monitor a control channel on a different carrier.

The UE 10 may comprise a transmitting unit 804, e.g. a transmitter or a transceiver. The UE 10, the processing circuitry 801, and/or the transmitting unit 804 may be configured to transmit a confirmation to the radio network node confirming reception of the paging signal.

The UE 10 further comprises a memory 807. The memory comprises one or more units to be used to store data on, such as RSs, strengths or qualities, paging signals, carriers, applications to perform the methods disclosed herein when being executed, and similar. The UE 10 comprises a communication interface comprising one or more antennas.

The methods according to the embodiments described herein for the UE 10 are respectively implemented by means of e.g. a computer program product 805 or a computer program, comprising instructions, i.e., software code portions, which, when executed on at least one processor, cause the at least one processor to carry out the actions described herein, as performed by the UE 10. The computer program product 805 may be stored on a computer-readable storage medium 806, e.g. a universal serial bus (USB) stick, a disc or similar. The computer-readable storage medium 806, having stored thereon the computer program product, may comprise the instructions which, when executed on at least one processor, cause the at least one processor to carry out the actions described herein, as performed by the UE 10. In some embodiments, the computer-readable storage medium may be a non-transitory or a transitory computer-readable storage medium.

In some embodiments the non-limiting term wireless device or user equipment (UE) is used and it refers to any type of wireless device communicating with a network node and/or with another UE in a cellular or mobile communication system. Examples of UE are target device, device-to-device (D2D) UE, proximity capable UE (aka ProSe UE), machine type UE or UE capable of machine to machine (M2M) communication, PDA, PAD, Tablet, mobile terminals, smart phone, laptop embedded equipped (LEE), laptop mounted equipment (LME), USB dongles etc.

The embodiments are described for Narrowband IoT and/or LTE-M. However the embodiments are applicable to any RAT or multi-RAT systems, where the UE receives and/or transmit signals (e.g. data) e.g. New Radio (NR), LTE, LTE FDD/TDD, WCDMA/HSPA, GSM/GERAN, Wi Fi, WLAN, CDMA2000 etc.

As will be readily understood by those familiar with communications design, that functions means or modules may be implemented using digital logic and/or one or more microcontrollers, microprocessors, or other digital hardware. In some embodiments, several or all of the various functions may be implemented together, such as in a single application-specific integrated circuit (ASIC), or in two or more separate devices with appropriate hardware and/or software interfaces between them. Several of the functions may be implemented on a processor shared with other functional components of a wireless device or network node, for example.

Alternatively, several of the functional elements of the processing means discussed may be provided through the use of dedicated hardware, while others are provided with hardware for executing software, in association with the appropriate software or firmware. Thus, the term "processor" or "controller" as used herein does not exclusively refer to hardware capable of executing software and may implicitly include, without limitation, digital signal processor (DSP) hardware, read-only memory (ROM) for storing software, random-access memory for storing software and/or program or application data, and non-volatile memory. Other hardware, conventional and/or custom, may also be included. Designers of communications devices will appreciate the cost, performance, and maintenance trade-offs inherent in these design choices.

Figure 6:
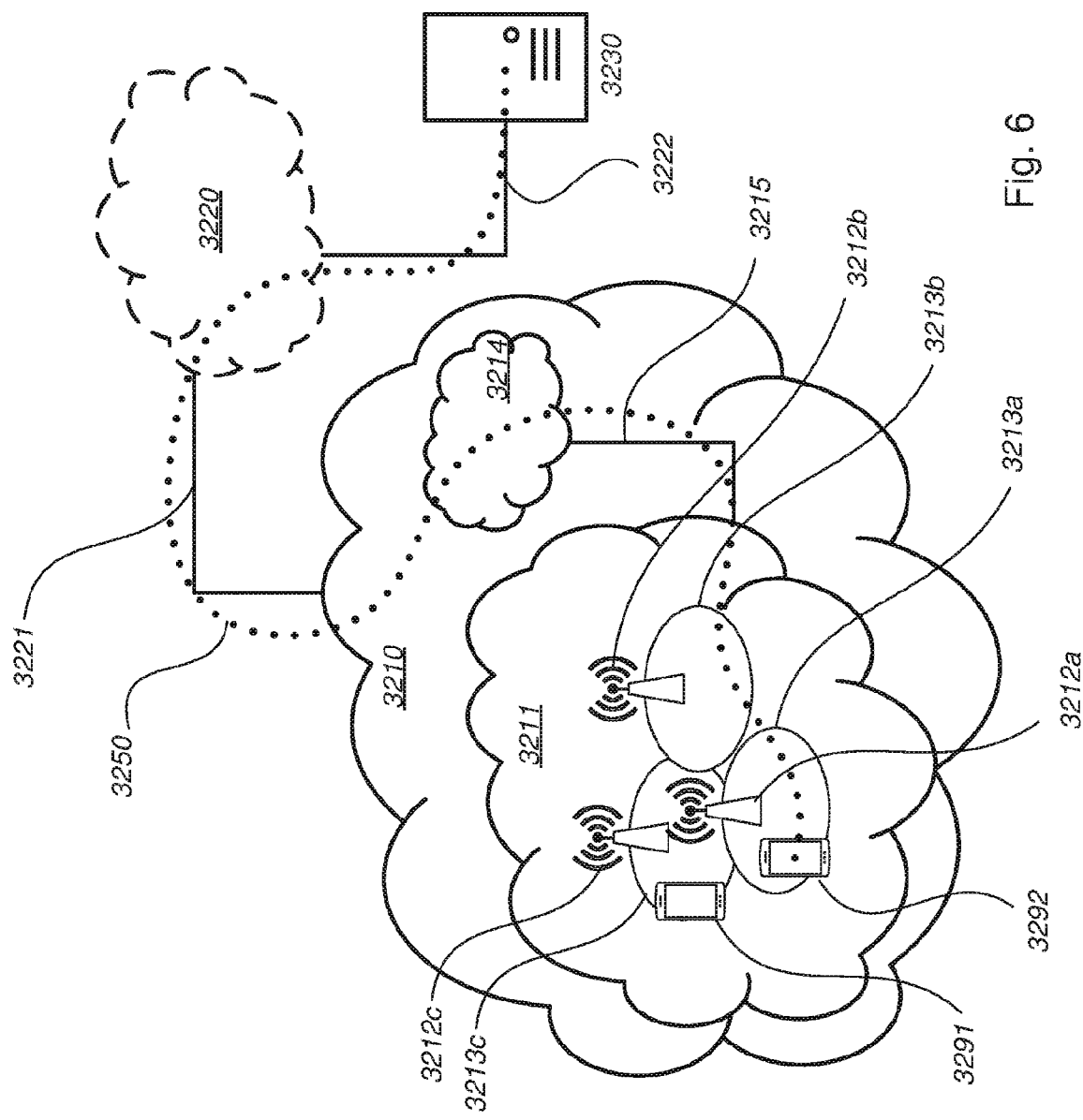
FIG. 6 schematically illustrates a telecommunication network connected via an intermediate network to a host computer.

With reference to FIG. 6, in accordance with an embodiment, a communication system includes a telecommunication network 3210, such as a 3GPP-type cellular network, which comprises an access network 3211, such as a radio access network, and a core network 3214. The access network 3211 comprises a plurality of base stations 3212*a*, 3212*b*, 3212*c*, such as NBs, eNBs, gNBs or other types of wireless access points being examples of the radio network node 12 herein, each defining a corresponding coverage area 3213*a*, 3213*b*, 3213*c*. Each base station 3212*a*, 3212*b*, 3212*c* is connectable to the core network 3214 over a wired or wireless connection 3215. A first user equipment (UE) 3291, being an example of the UE 10, located in coverage area 3213*c* is configured to wirelessly connect to, or be paged by, the corresponding base station 3212*c*. A second UE 3292 in coverage area 3213*a* is wirelessly connectable to the corresponding base station 3212*a*. While a plurality of UEs 3291, 3292 are illustrated in this example, the disclosed embodiments are equally applicable to a situation where a sole UE is in the coverage area or where a sole UE is connecting to the corresponding base station 3212.

The telecommunication network 3210 is itself connected to a host computer 3230, which may be embodied in the hardware and/or software of a standalone server, a cloud-implemented server, a distributed server or as processing resources in a server farm. The host computer 3230 may be under the ownership or control of a service provider, or may be operated by the service provider or on behalf of the service provider. The connections 3221, 3222 between the telecommunication network 3210 and the host computer 3230 may extend directly from the core network 3214 to the host computer 3230 or may go via an optional intermediate network 3220. The intermediate network 3220 may be one of, or a combination of more than one of, a public, private or hosted network; the intermediate network 3220, if any, may be a backbone network or the Internet; in particular, the intermediate network 3220 may comprise two or more sub-networks (not shown).

The communication system of FIG. 6 as a whole enables connectivity between one of the connected UEs 3291, 3292 and the host computer 3230. The connectivity may be described as an over-the-top (OTT) connection 3250. The host computer 3230 and the connected UEs 3291, 3292 are configured to communicate data and/or signaling via the OTT connection 3250, using the access network 3211, the core network 3214, any intermediate network 3220 and possible further infrastructure (not shown) as intermediaries. The OTT connection 3250 may be transparent in the sense that the participating communication devices through which the OTT connection 3250 passes are unaware of routing of uplink and downlink communications. For example, a base station 3212 may not or need not be informed about the past routing of an incoming downlink communication with data originating from a host computer 3230 to be forwarded (e.g., handed over) to a connected UE 3291. Similarly, the base station 3212 need not be aware of the future routing of an outgoing uplink communication originating from the UE 3291 towards the host computer 3230.

Example implementations, in accordance with an embodiment, of the UE, base station and host computer discussed in the preceding paragraphs will now be described with reference to FIG. 7. In a communication system 3300, a host computer 3310 comprises hardware 3315 including a communication interface 3316 configured to set up and maintain a wired or wireless connection with an interface of a different communication device of the communication system 3300. The host computer 3310 further comprises processing circuitry 3318, which may have storage and/or processing capabilities. In particular, the processing circuitry 3318 may comprise one or more programmable processors, application-specific integrated circuits, field programmable gate arrays or combinations of these (not shown) adapted to execute instructions. The host computer 3310 further comprises software 3311, which is stored in or accessible by the host computer 3310 and executable by the processing circuitry 3318. The software 3311 includes a host application 3312. The host application 3312 may be operable to provide a service to a remote user, such as a UE 3330 connecting via an OTT connection 3350 terminating at the UE 3330 and the host computer 3310. In providing the service to the remote user, the host application 3312 may provide user data which is transmitted using the OTT connection 3350.

The communication system 3300 further includes a base station 3320 provided in a telecommunication system and comprising hardware 3325 enabling it to communicate with the host computer 3310 and with the UE 3330. The hardware 3325 may include a communication interface 3326 for setting up and maintaining a wired or wireless connection with an interface of a different communication device of the communication system 3300, as well as a radio interface 3327 for setting up and maintaining at least a wireless connection 3370 with a UE 3330 located in a coverage area (not shown in FIG. 7) served by the base station 3320. The communication interface 3326 may be configured to facilitate a connection 3360 to the host computer 3310. The connection 3360 may be direct or it may pass through a core network (not shown in FIG. 7) of the telecommunication system and/or through one or more intermediate networks outside the telecommunication system. In the embodiment shown, the hardware 3325 of the base station 3320 further includes processing circuitry 3328, which may comprise one or more programmable processors, application-specific integrated circuits, field programmable gate arrays or combinations of these (not shown) adapted to execute instructions. The base station 3320 further has software 3321 stored internally or accessible via an external connection.

The communication system 3300 further includes the UE 3330 already referred to. Its hardware 3335 may include a radio interface 3337 configured to set up and maintain a wireless connection 3370 with a base station serving a coverage area in which the UE 3330 is currently located. The hardware 3335 of the UE 3330 further includes processing circuitry 3338, which may comprise one or more programmable processors, application-specific integrated circuits, field programmable gate arrays or combinations of these (not shown) adapted to execute instructions. The UE 3330 further comprises software 3331, which is stored in or accessible by the UE 3330 and executable by the processing circuitry 3338. The software 3331 includes a client application 3332. The client application 3332 may be operable to provide a service to a human or non-human user via the UE 3330, with the support of the host computer 3310. In the host computer 3310, an executing host application 3312 may communicate with the executing client application 3332 via the OTT connection 3350 terminating at the UE 3330 and the host computer 3310. In providing the service to the user, the client application 3332 may receive request data from the host application 3312 and provide user data in response to the request data. The OTT connection 3350 may transfer both the request data and the user data. The client application 3332 may interact with the user to generate the user data that it provides.

Figure 7:
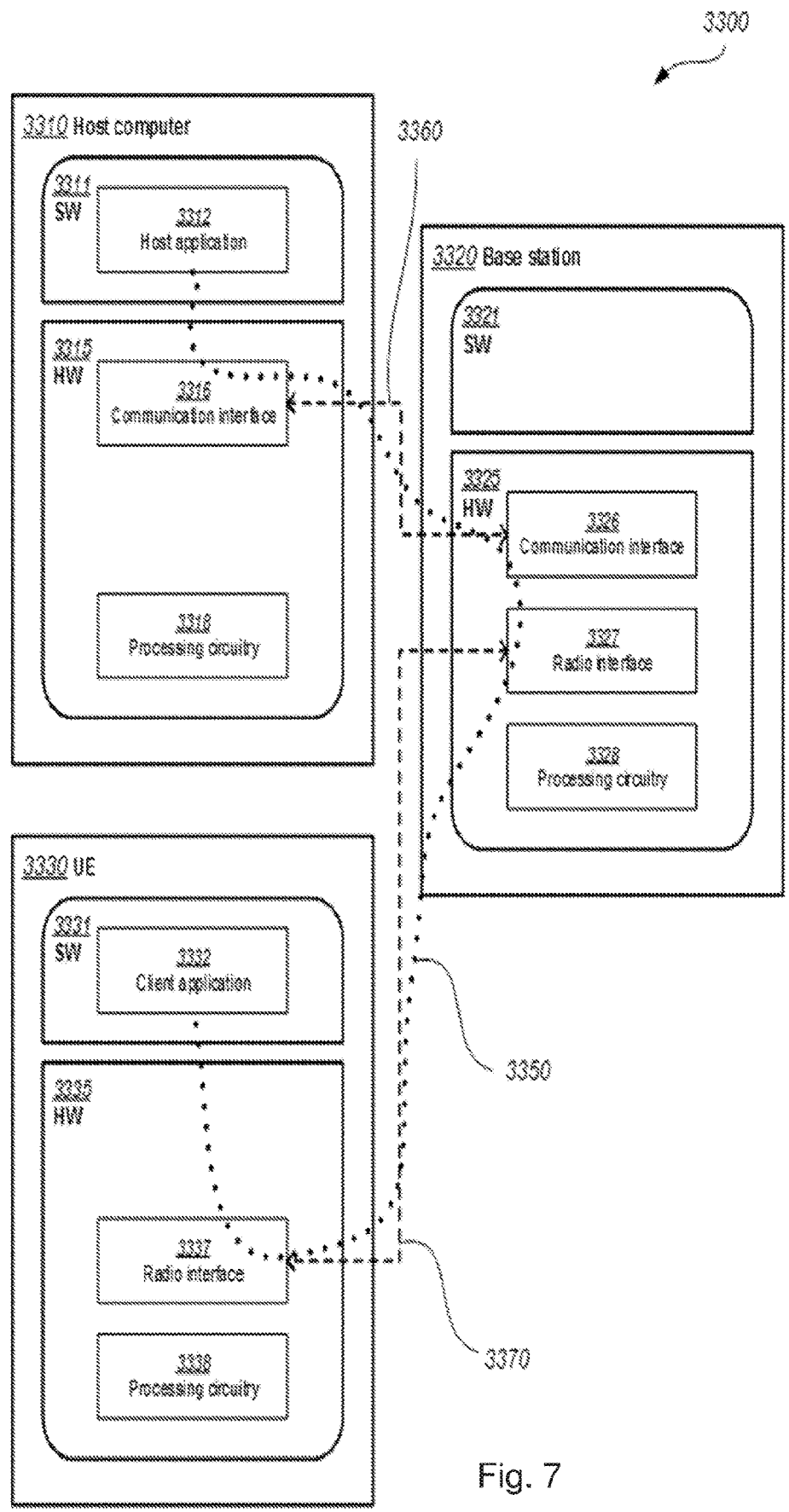
FIG. 7 is a generalized block diagram of a host computer communicating via a base station with a user equipment over a partially wireless connection.

It is noted that the host computer 3310, base station 3320 and UE 3330 illustrated in FIG. 7 may be identical to the host computer 3230, one of the base stations 3212a, 3212b, 3212c and one of the UEs 3291, 3292 of FIG. 6, respectively. This is to say, the inner workings of these entities may be as shown in FIG. 7 and independently, the surrounding network topology may be that of FIG. 6.

In FIG. 7, the OTT connection 3350 has been drawn abstractly to illustrate the communication between the host computer 3310 and the user equipment 3330 via the base station 3320, without explicit reference to any intermediary devices and the precise routing of messages via these devices. Network infrastructure may determine the routing, which it may be configured to hide from the UE 3330 or from the service provider operating the host computer 3310, or both. While the OTT connection 3350 is active, the network infrastructure may further take decisions by which it dynamically changes the routing (e.g., on the basis of load balancing consideration or reconfiguration of the network).

The wireless connection 3370 between the UE 3330 and the base station 3320 is in accordance with the teachings of the embodiments described throughout this disclosure. One or more of the various embodiments improve the performance of OTT services provided to the UE 3330 using the OTT connection 3350, in which the wireless connection 3370 forms the last segment. More precisely, the teachings of these embodiments may improve battery time since only UE of a certain type is paged and that may affect the battery time of the UEs and thereby provide benefits such as improved performance of the UEs, and e.g. better responsiveness.

A measurement procedure may be provided for the purpose of monitoring data rate, latency and other factors on which the one or more embodiments improve. There may further be an optional network functionality for reconfiguring the OTT connection 3350 between the host computer 3310 and UE 3330, in response to variations in the measurement results. The measurement procedure and/or the network functionality for reconfiguring the OTT connection 3350 may be implemented in the software 3311 of the host computer 3310 or in the software 3331 of the UE 3330, or both. In embodiments, sensors (not shown) may be deployed in or in association with communication devices through which the OTT connection 3350 passes; the sensors may participate in the measurement procedure by supplying values of the monitored quantities exemplified above, or supplying values of other physical quantities from which software 3311, 3331 may compute or estimate the monitored quantities. The reconfiguring of the OTT connection 3350 may include message format, retransmission settings, preferred routing etc.; the reconfiguring need not affect the base station 3320, and it may be unknown or imperceptible to the base station 3320. Such procedures and functionalities may be known and practiced in the art. In certain embodiments, measurements may involve proprietary UE signaling facilitating the host computer's 3310 measurements of throughput, propagation times, latency and the like. The measurements may be implemented in that the software 3311, 3331 causes messages to be transmitted, in particular empty or 'dummy' messages, using the OTT connection 3350 while it monitors propagation times, errors etc.

FIG. 8 is a flowchart illustrating a method implemented in a communication system, in accordance with one embodiment. The communication system includes a host computer, a base station and a UE which may be those described with reference to FIGS. 6 and 7. For simplicity of the present disclosure, only drawing references to FIG. 8 will be included in this section. In a first step 3410 of the method, the host computer provides user data. In an optional substep 3411 of the first step 3410, the host computer provides the user data by executing a host application. In a second step 3420, the host computer initiates a transmission carrying the user data to the UE. In an optional third step 3430, the base station transmits to the UE the user data which was carried in the transmission that the host computer initiated, in accordance with the teachings of the embodiments described throughout this disclosure. In an optional fourth step 3440, the UE executes a client application associated with the host application executed by the host computer.

FIG. 9 is a flowchart illustrating a method implemented in a communication system, in accordance with one embodiment. The communication system includes a host computer, a base station and a UE which may be those described with reference to FIGS. 6 and 7. For simplicity of the present disclosure, only drawing references to FIG. 9 will be included in this section. In a first step 3510 of the method, the host computer provides user data. In an optional substep (not shown) the host computer provides the user data by executing a host application. In a second step 3520, the host computer initiates a transmission carrying the user data to the UE. The transmission may pass via the base station, in accordance with the teachings of the embodiments described throughout this disclosure. In an optional third step 3530, the UE receives the user data carried in the transmission.

FIG. 10 is a flowchart illustrating a method implemented in a communication system, in accordance with one embodiment. The communication system includes a host computer, a base station and a UE which may be those described with reference to FIGS. 6 and 7. For simplicity of the present disclosure, only drawing references to FIG. 10 will be included in this section. In an optional first step 3610 of the method, the UE receives input data provided by the host computer. Additionally or alternatively, in an optional second step 3620, the UE provides user data. In an optional substep 3621 of the second step 3620, the UE provides the user data by executing a client application. In a further optional substep 3611 of the first step 3610, the UE executes a client application which provides the user data in reaction to the received input data provided by the host computer. In providing the user data, the executed client application may further consider user input received from the user. Regardless of the specific manner in which the user data was provided, the UE initiates, in an optional third substep 3630, transmission of the user data to the host computer. In a fourth step 3640 of the method, the host computer receives the user data transmitted from the UE, in accordance with the teachings of the embodiments described throughout this disclosure.

FIG. 11 is a flowchart illustrating a method implemented in a communication system, in accordance with one embodiment. The communication system includes a host computer, a base station and a UE which may be those described with reference to FIGS. 6 and 7. For simplicity of the present disclosure, only drawing references to FIG. 11 will be included in this section. In an optional first step 3710 of the method, in accordance with the teachings of the embodiments described throughout this disclosure, the base station receives user data from the UE. In an optional second step 3720, the base station initiates transmission of the received user data to the host computer. In a third step 3730, the host computer receives the user data carried in the transmission initiated by the base station.

It will be appreciated that the foregoing description and the accompanying drawings represent non-limiting examples of the methods and apparatus taught herein. As such, the apparatus and techniques taught herein are not limited by the foregoing description and accompanying drawings. Instead, the embodiments herein are limited only by the following claims and their legal equivalents.

Abbreviations

ACK Acknowledged
ADC Analog-to-digital conversion
AGC Automatic gain control
ANR Automatic neighbour relations
AP Access point
BCH Broadcast channel
BLER Block error rate
BRS Beam Reference Signal
BS Base station
BSC Base station controller
BTS Base transceiver station
CA Carrier aggregation
CC Component carrier
CG Cell group
CGI Cell global identity
CP Cyclic prefix
CPICH Common pilot channel
CQI Channel Quality Indicator
CSG Closed subscriber group
CSI-RS Channel State Information Reference Signal
DAS Distributed antenna system
DC Dual connectivity
DFT Discrete Fourier Transform
DL Downlink
DL-SCH Downlink shared channel
DRX Discontinuous reception
EARFCN Evolved absolute radio frequency channel number
ECGI Evolved CGI
eNB eNodeB
FDD Frequency division duplex
FFT Fast Fourier transform
HD-FDD Half duplex FDD
HO Handover
ID Identity
M2M machine to machine MAC Media access control
MCG Master cell group
MDT Minimization of drive tests
MeNB Master eNode B
MIB Master information block
MME Mobility management entity
MRS Mobility Reference Signal
MRTD Maximum receive timing difference
MSR Multi-standard radio
NACK Not acknowledged
OFDM Orthogonal frequency-division multiplexing
RI Rank Indicator
SI System Information
PCC Primary component carrier
PCI Physical cell identity
PCell Primary Cell
PCG Primary Cell Group
PCH Paging channel
PDU Protocol data unit
PGW Packet gateway
PHICH Physical HARQ indication channel
PLMN Public land mobile network
PMI Precoding Matrix Indicator
PSCell Primary SCell
PSC Primary serving cell
PSS Primary synchronization signal
RAT Radio access Technology
RF Radio frequency
RLM Radio link monitoring
RNC Radio network Controller
RRC Radio resource control
RRH Remote radio head
RRU Remote radio unit
RSCP Received signal code power
RSRP Reference Signal Received Power
RSRQ Reference Signal Received Quality
RSSI Received signal strength indication
RSTD Reference signal time difference
RV Redundancy version
Rx Receiver
SCC Secondary component carrier
SCell Secondary Cell
SCG Secondary Cell Group
SeNB Secondary eNode B
SFN System frame number
SGW Signalling gateway
SI System information
SIB System information block
SIB1 System information block type 1
SINR Signal to interference and noise ratio
SON Self-organizing networks
SSC Secondary serving cell
SSS Secondary synchronization signal
TA Timing advance
TAG Timing advance group
TDD Time division duplex
Tx Transmitter
UARFCN UMTS Absolute Radio Frequency Channel Number
UE User equipment
UL Uplink

The invention claimed is:

1. A method performed by radio network node for paging a user equipment, (UE) in a wireless communication network, the method comprising:
   transmitting a second paging signal on a carrier to the UE, wherein
   the carrier is associated with the second paging signal for a second type of UEs,
   a first number of carriers are configured for a first paging signal for a first type of UEs,
   a second number of carriers are configured for the second paging signal for the second type of UEs,
   the first paging signal comprises a first wake-up signal (WUS),
   the second paging signal comprises a group wake-up signal (GWUS) for a group of UEs of the second type of UEs,
   the second type of UEs has capability to support the GWUS, and
   the first type of UEs does not have capability to support the GWUS.

2. The method of claim 1, wherein the carrier is associated with the second paging signal for the second type of UEs by being configured for the second paging signal of the second type of UEs.

3. The method of claim 1, transmitting a configuration message carrying information from which the UE determines that the carrier is associated with the second paging signal.

4. The method of claim 1, further comprising:
   determining the carrier used for the second type of UEs for GWUS based on identity of the UE.

5. The method of claim 1, wherein
   the second type of UEs supports a WUS according to a release-16 standard, and
   the first type of UEs does not support the WUS according to the release-16 standard.

6. A method performed by a user equipment (UE) for monitoring a paging channel in a wireless communication network, wherein the UE is of a second type of UEs out of a first and second types of UEs, the method comprising:
   monitoring for a second paging signal on a carrier, wherein
   the carrier is associated with the second paging signal for the second type of UEs,
   a first number of carriers are configured for a first paging signal for the first type of UEs,
   a second number of carriers are configured for the second paging signal for the second type of UEs,
   the first paging signal comprises a first wake-up signal (WUS),
   the second paging signal comprises a group wake-up signal (GWUS) for a group of UEs of the second type of UEs,
   the second type of UEs has capability to support the GWUS, and
   the first type of UEs does not have capability to support the GWUS.

7. The method of claim 6, further comprising:
   receiving a configuration message carrying information from which the UE determines the carrier to monitor for the second paging signal.

8. The method of claim 6, wherein
   the carrier is associated with the second paging signal for the second type of UEs by being configured for the second paging signal of the second type of UEs.

9. The method of claim 6, further comprising:
   detecting the second paging signal on the carrier; and
   upon detection of the second paging signal, monitoring a control channel on a different carrier.

10. The method of claim 6, wherein
monitoring further comprises monitoring for the first paging signal on a first carrier, wherein the first carrier is associated with the first paging signal for the first type of UEs.

11. The method of claim 6, further comprising:
determining the carrier used for the second type of UEs for group WUS based on an identity of the UE.

12. The method of claim 6, wherein
the second type of UEs supports a WUS according to a release-16 standard, and
the first type of UEs does not support the WUS according to the release-16 standard.

13. A radio network node for paging a user equipment (UE) in a wireless communication network, wherein the radio network node comprises:
memory; and
processing circuitry coupled to the memory, wherein the radio network node is configured to perform a method comprising:
transmitting a second paging signal on a carrier to the UE, wherein
the carrier is associated with the second paging signal for a second type of UEs,
a first number of carriers are configured for a first paging signal for a first type of UEs,
a second number of carriers are configured for the second paging signal for the second type of UEs,
the first paging signal comprises a first wake-up signal (WUS),
the second paging signal comprises a group wake-up signal (GWUS) for a group of UEs of the second type of UEs,
the second type of UEs has capability to support the GWUS, and
the first type of UEs does not have capability to support the GWUS.

14. A user equipment (UE) for monitoring a paging channel in a wireless communication network, wherein the UE is of a second type of UEs out of a first and second types of UEs and the UE comprises:
memory; and
processing circuitry coupled to the memory, wherein the UE is configured to perform a method comprising:
monitoring for a second paging signal on a carrier, wherein
the carrier is associated with the second paging signal for the second type of UEs,
a first number of carriers are configured for a first paging signal for the first type of UEs,
a second number of carriers are configured for the second paging signal for the second type of UEs,
the first paging signal comprises a first wake-up signal (WUS),
the second paging signal comprises a group wake-up signal (GWUS) for a group of UEs of the second type of UEs,
the second type of UEs has capability to support the GWUS, and
the first type of UEs does not have capability to support the GWUS.

15. A method performed by radio network node for paging a user equipment, (UE) in a wireless communication network, wherein a first set of carriers is configured for a wake-up signal (WUS) for UEs of a first type and a second set of carriers is configured for a group WUS (GWUS) for a group of UEs of a second type that is different than the first type, the method comprising:
detecting a need to transmit a page to a first UE;
determining whether the first UE is a UE of the first type or a UE of the second type; and
as a result of detecting the need to transmit the page and determining that the first UE is a UE of the second type, transmitting a paging signal on a carrier included in the second set of carriers, wherein the paging signal comprises the GWUS, wherein the method further comprises
prior to detecting the need to transmit the page to the first UE, providing configuration information to the first UE to inform the first UE that the first UE should monitor carriers within the second set of carriers for the GWUS.

16. The method of claim 15, wherein providing the configuration information to the first UE comprises transmitting an information element (IE) comprising the configuration information, wherein any UE of the first type is configured to ignore the IE and the first UE is configured to not ignore the IE.

17. A method performed by a user equipment (UE) for monitoring a paging channel in a wireless communication network, wherein a first set of carriers is configured for a wake-up signal (WUS) for UEs of a first type and a second set of carriers is configured for a group WUS (GWUS) for a group of UEs of a second type that is different than the first type, the method comprising:
the UE receiving GWUS configuration information intended only for UEs of the second type, wherein the GWUS configuration information indicates a carrier from the second set of carriers; and
monitoring for a paging signal the carrier indicated by the GWUS configuration information, wherein
receiving the GWUS configuration information comprises receiving a configuration message carrying the GWUS configuration information, and
the configuration message comprises a first information element (IE) comprising the GWUS configuration information, wherein any UE of the first type is configured to ignore the first IE and the first UE is configured to not ignore the first IE.

18. The method of claim 17, wherein the configuration message further comprises a second IE comprising WUS configuration information, wherein any UE of the first type is configured to not ignore the second IE.

19. A method performed by a user equipment (UE) for monitoring a paging channel in a wireless communication network, wherein a first set of carriers is configured for a wake-up signal (WUS) for UEs of a first type and a second set of carriers is configured for a group WUS (GWUS) for a group of UEs of a second type that is different than the first type, the method comprising:
the UE receiving GWUS configuration information intended only for UEs of the second type, wherein the GWUS configuration information indicates a carrier from the second set of carriers; and
monitoring for a paging signal the carrier indicated by the GWUS configuration information, wherein the method further comprises:
detecting the GWUS on the carrier indicated by the GWUS configuration information; and
as a result of detecting the GWUS, monitoring a control channel on a carrier different than the carrier indicated by the GWUS configuration information.

* * * * *

UNITED STATES PATENT AND TRADEMARK OFFICE
CERTIFICATE OF CORRECTION

| | |
|---|---|
| PATENT NO. | : 12,143,934 B2 |
| APPLICATION NO. | : 17/280263 |
| DATED | : November 12, 2024 |
| INVENTOR(S) | : Höglund et al. |

It is certified that error appears in the above-identified patent and that said Letters Patent is hereby corrected as shown below:

On the Title Page

On Page 2, in Item (56), under "OTHER PUBLICATIONS", in Column 1, Lines 1-2, delete "GPP TSG RAN WG1 Meoting #91 R1-1720423 Rano, USA, Nov. 27"˜Dec. 1, 2017 Agenda item: 6.2.6.1.1.2 (Year: 2017).".

In the Specification

In Column 4, Line 22, delete "444444444444444444444$_{f\_start\_PO}$" and insert -- $n_{f\_start\_PO}$ --, therefor.

In Column 5, Line 64, delete "(VVUS)" and insert -- (WUS) --, therefor.

In Column 7, Line 64, delete "LTE," and insert -- LTE, Wi-Fi, --, therefor.

In Columns 9 & 10, in TABLE SystemInformationBlockType22-NB Information Element, Line 12, delete "DL-ConfigCommonList-NE-r14" and insert -- DL-ConfigCommonList-NB-r14 --, therefor.

In Columns 11 & 12, in TABLE-continued, Line 28, delete "Need OP" and insert -- Need OR --, therefor.

In Columns 11 & 12, in TABLE-continued, Line 42, delete "Need OP" and insert -- Need OR --, therefor.

In Columns 11 & 12, in TABLE-continued, Line 61, delete "NPRACH-ParametersList-NE-r14 ::=" and insert -- NPRACH-ParametersList-NB-r14 ::= --, therefor.

In Columns 11 & 12, in TABLE-continued, Line 67, delete "NEED OP" and insert -- NEED OR --, therefor.

Signed and Sealed this
Twenty-ninth Day of April, 2025

Coke Morgan Stewart
*Acting Director of the United States Patent and Trademark Office*

CERTIFICATE OF CORRECTION (continued)
U.S. Pat. No. 12,143,934 B2

In Columns 11 & 12, in TABLE-continued, Line 70, delete "NEED OP" and insert -- NEED OR --, therefor.

In Columns 11 & 12, in TABLE-continued, Line 73, delete "NEED OP" and insert -- NEED OR --, therefor.

In Columns 11 & 12, in TABLE-continued, Line 75, delete "NEED OP" and insert -- NEED OR --, therefor.

In Columns 11 & 12, in TABLE-continued, Line 77, delete "NEED OP" and insert -- NEED OR --, therefor.

In Columns 13 & 14, in TABLE-continued, Line 3, delete "NEED OP" and insert -- NEED OR --, therefor.

In Columns 13 & 14, in TABLE-continued, Line 6, delete "NEED OP" and insert -- NEED OR --, therefor.

In Columns 13 & 14, in TABLE-continued, Line 9, delete "NEED OP" and insert -- NEED OR --, therefor.

In Columns 13 & 14, in TABLE-continued, Line 14, delete "NEED OP" and insert -- NEED OR --, therefor.

In Columns 13 & 14, in TABLE-continued, Line 16, delete "Need OP" and insert -- Need OR --, therefor.

In Columns 13 & 14, in TABLE-continued, Line 30, delete "Need OP" and insert -- Need OR --, therefor.

In Columns 13 & 14, in TABLE-RadioResourceConfigCommon Information Element, Line 16, delete "[[ tech-ConfigCommon-v1250" and insert -- [[ rach-ConfigCommon-v1250 --, therefor.

In Columns 15 & 16, in TABLE-continued, Line 32, delete "paging- narrowBands-r16" and insert -- paging- narrowBands-r13 --, therefor.

In Column 20, Line 19, delete "Mobile" and insert -- Mobility --, therefor.

In Column 21, Line 57, delete "equipped" and insert -- equipment --, therefor.

In Column 27, Line 20, delete "Packet gateway" and insert -- Packet data network gateway --, therefor.

In Column 27, Line 50, delete "Signal to interference and noise ratio" and insert -- Signal-to-interference-plus-noise ratio --, therefor.